United States Patent
Barman et al.

(10) Patent No.: US 7,432,069 B2
(45) Date of Patent: Oct. 7, 2008

(54) BIOCOMPATIBLE CHEMICALLY CROSSLINKED HYDROGELS FOR GLUCOSE SENSING

(75) Inventors: Shikha P. Barman, Bedford, MA (US); Helice A. Schramm, North Attleboro, MA (US); Nicholas F. Warner, Belmont, MA (US)

(73) Assignee: Sontra Medical Corporation, Franklin, MA (US)

( * ) Notice: Subject to any disclaimer, the term of this patent is extended or adjusted under 35 U.S.C. 154(b) by 179 days.

(21) Appl. No.: 11/275,043

(22) Filed: Dec. 5, 2005

(65) Prior Publication Data
US 2007/0128681 A1 Jun. 7, 2007

(51) Int. Cl.
*C12Q 1/54* (2006.01)

(52) U.S. Cl. .......................... 435/14; 514/866; 523/105

(58) Field of Classification Search .................. 435/14; 514/866; 523/105; 528/392; 600/347; 604/304
See application file for complete search history.

(56) References Cited

U.S. PATENT DOCUMENTS

| | | |
|---|---|---|
| 3,551,554 A | 12/1970 | Herschler |
| 3,711,602 A | 1/1973 | Herschler |
| 3,711,606 A | 1/1973 | Herschler |
| 3,828,769 A | 8/1974 | Mettier |
| 4,002,221 A | 1/1977 | Buchalter |
| 4,020,830 A | 5/1977 | Johnson et al. |
| 4,127,125 A | 11/1978 | Takemoto et al. |
| 4,144,646 A | 3/1979 | Takemoto et al. |
| 4,176,664 A | 12/1979 | Kalish |
| 4,249,531 A | 2/1981 | Heller et al. |
| 4,280,494 A | 7/1981 | Cosgrove et al. |
| 4,309,989 A | 1/1982 | Fahim |
| 4,372,296 A | 2/1983 | Fahim |
| 4,457,748 A | 7/1984 | Lattin et al. |
| 4,537,776 A | 8/1985 | Cooper |
| 4,557,943 A | 12/1985 | Rosler et al. |
| 4,563,184 A | 1/1986 | Korol |
| 4,595,011 A | 6/1986 | Phillips |
| 4,646,725 A | 3/1987 | Moasser |
| 4,657,543 A | 4/1987 | Langer et al. |
| 4,683,242 A | 7/1987 | Poser |
| 4,698,058 A | 10/1987 | Greenfeld et al. |
| 4,732,153 A | 3/1988 | Phillips |
| 4,767,402 A | 8/1988 | Kost et al. |
| 4,779,806 A | 10/1988 | Langer et al. |
| 4,780,212 A | 10/1988 | Kost et al. |
| 4,786,277 A | 11/1988 | Powers |
| 4,787,070 A | 11/1988 | Suzuki et al. |
| 4,787,888 A | 11/1988 | Fox |
| 4,805,623 A | 2/1989 | Jobsis et al. |
| 4,820,720 A | 4/1989 | Sanders et al. |
| 4,821,733 A | 4/1989 | Peck |
| 4,821,740 A | 4/1989 | Tachibana et al. |
| 4,834,978 A | 5/1989 | Nuwayser |
| 4,855,298 A | 8/1989 | Yamada et al. |
| 4,860,058 A | 8/1989 | Kobayashi et al. |
| 4,863,970 A | 9/1989 | Patel et al. |
| 4,866,050 A | 9/1989 | Ben-Amoz |
| 4,933,062 A | 6/1990 | Shaw et al. |
| 4,948,587 A | 8/1990 | Kost et al. |
| 4,953,552 A | 9/1990 | DeMarzo |
| 4,953,565 A | 9/1990 | Tachibana et al. |
| 4,970,145 A | 11/1990 | Bennetto et al. |
| 4,981,779 A | 1/1991 | Wagnet |
| 4,986,271 A | 1/1991 | Wilkins |
| 5,001,051 A | 3/1991 | Miller et al. |
| 5,006,342 A | 4/1991 | Cleary et al. |
| 5,007,438 A | 4/1991 | Tachibana et al. |
| 5,016,615 A | 5/1991 | Driller et al. |
| 5,019,034 A | 5/1991 | Weaver et al. |
| 5,050,604 A | 9/1991 | Reshef et al. |
| 5,069,908 A | 12/1991 | Henley |
| 5,076,273 A | 12/1991 | Schoendorfer et al. |
| 5,078,144 A | 1/1992 | Sekino et al. |
| 5,082,786 A | 1/1992 | Nakamoto |
| 5,086,229 A | 2/1992 | Rosenthal et al. |
| 5,115,805 A | 5/1992 | Bommannan et al. |
| 5,118,404 A | 6/1992 | Saito |
| 5,119,819 A | 6/1992 | Thomas et al. |
| 5,120,544 A | 6/1992 | Henley |
| 5,134,057 A | 7/1992 | Kuypers et al. |
| 5,135,753 A | 8/1992 | Baker et al. |

(Continued)

FOREIGN PATENT DOCUMENTS

CA 2196746 8/1991

(Continued)

OTHER PUBLICATIONS

Brahim S. et al. Polypyrrole Hydrogel Composites for the Construction of Clinically Important Biosensors. Biosensors & Bioelectronics 17 2002, 53-59.*

(Continued)

*Primary Examiner*—Ralph Gitomer
(74) *Attorney, Agent, or Firm*—Hunton & Williams LLP

(57) ABSTRACT

An hydrogel incorporating a biologically active component is provided that is useful as an interface material for transdermal sensing applications. Specifically, the hydrogel has a crosslinked gel structure and a biologically active component incorporated into the crosslinked gel structure, the biologically active component being capable of converting glucose into a compound having potentiometric activity.

21 Claims, 12 Drawing Sheets

U.S. PATENT DOCUMENTS

| | | | |
|---|---|---|---|
| 5,139,023 A | 8/1992 | Stanley et al. |
| 5,140,985 A | 8/1992 | Schroeder et al. |
| 5,161,532 A | 11/1992 | Joseph |
| 5,165,407 A | 11/1992 | Wilson et al. |
| 5,165,418 A | 11/1992 | Tankovich |
| 5,171,215 A | 12/1992 | Flanagan |
| 5,197,946 A | 3/1993 | Tachibana |
| 5,215,520 A | 6/1993 | Shroot et al. |
| 5,215,887 A | 6/1993 | Saito |
| 5,230,334 A | 7/1993 | Klopotek |
| 5,231,975 A | 8/1993 | Bommannan et al. |
| 5,236,410 A | 8/1993 | Granov et al. |
| 5,250,419 A | 10/1993 | Bernard et al. |
| 5,267,985 A | 12/1993 | Shimada et al. |
| 5,279,543 A | 1/1994 | Glikfeld et al. |
| 5,282,785 A | 2/1994 | Shapland et al. |
| 5,286,254 A | 2/1994 | Shapland et al. |
| 5,315,998 A | 5/1994 | Tachibana et al. |
| 5,323,769 A | 6/1994 | Bommannan et al. |
| 5,330,756 A | 7/1994 | Steuart et al. |
| 5,362,307 A | 11/1994 | Guy et al. |
| 5,364,838 A | 11/1994 | Rubsamen |
| 5,386,837 A | 2/1995 | Sterzer |
| 5,401,237 A | 3/1995 | Tachibana et al. |
| 5,405,366 A | 4/1995 | Fox et al. |
| 5,405,614 A | 4/1995 | D'Angelo et al. |
| 5,413,550 A | 5/1995 | Castel |
| 5,415,629 A | 5/1995 | Henley |
| 5,421,816 A | 6/1995 | Lipkovker |
| 5,429,735 A | 7/1995 | Johnson et al. |
| 5,443,080 A | 8/1995 | D'Angelo et al. |
| 5,445,611 A | 8/1995 | Eppstein et al. |
| 5,458,140 A | 10/1995 | Eppstein et al. |
| 5,470,582 A | 11/1995 | Supersaxo et al. |
| 5,534,496 A | 7/1996 | Lee et al. |
| 5,538,503 A | 7/1996 | Henley |
| 5,569,198 A | 10/1996 | Racchini |
| 5,573,778 A | 11/1996 | Therriault et al. |
| 5,582,184 A | 12/1996 | Erickson et al. |
| 5,582,586 A | 12/1996 | Tachibana et al. |
| 5,617,851 A | 4/1997 | Lipkovker |
| 5,618,275 A | 4/1997 | Bock |
| 5,626,554 A | 5/1997 | Ryaby et al. |
| 5,636,632 A | 6/1997 | Bommannan et al. |
| 5,646,221 A | 7/1997 | Inagi et al. |
| 5,655,539 A | 8/1997 | Wang et al. |
| 5,656,016 A | 8/1997 | Ogden |
| 5,658,247 A | 8/1997 | Henley |
| 5,667,487 A | 9/1997 | Henley |
| 5,722,397 A | 3/1998 | Eppstein |
| 5,730,714 A | 3/1998 | Guy et al. |
| 5,735,273 A | 4/1998 | Kurnik et al. |
| 5,746,217 A | 5/1998 | Erickson et al. |
| 5,771,890 A | 6/1998 | Tamada |
| 5,814,599 A | 9/1998 | Mitragotri et al. |
| 5,820,570 A | 10/1998 | Erickson et al. |
| 5,827,183 A | 10/1998 | Kurnik et al. |
| 5,851,438 A | 12/1998 | Chan |
| 5,885,211 A | 3/1999 | Eppstein et al. |
| 5,902,603 A | 5/1999 | Chen et al. |
| 5,906,830 A | 5/1999 | Farinas et al. |
| 5,947,921 A | 9/1999 | Johnson et al. |
| 5,961,451 A | 10/1999 | Reber et al. |
| 5,989,409 A | 11/1999 | Kurnik et al. |
| 6,002,961 A | 12/1999 | Mitragotri et al. |
| 6,002,962 A | 12/1999 | Huang et al. |
| 6,009,343 A | 12/1999 | Shain et al. |
| 6,018,678 A | 1/2000 | Mitragotri et al. |
| 6,041,253 A | 3/2000 | Kost et al. |
| 6,190,315 B1 | 2/2001 | Kost et al. |
| 6,201,065 B1 * | 3/2001 | Pathak et al. ............ 525/90 |
| 6,212,416 B1 | 4/2001 | Ward et al. |
| 6,234,990 B1 | 5/2001 | Rowe et al. |
| 6,251,083 B1 | 6/2001 | Yum et al. |
| 6,283,926 B1 | 9/2001 | Cunningham et al. |
| 6,287,438 B1 | 9/2001 | Knoll |
| 6,299,578 B1 | 10/2001 | Kurnik et al. |
| 6,309,351 B1 | 10/2001 | Kurnik et al. |
| 6,468,229 B1 | 10/2002 | Grace et al. |
| 6,482,604 B2 | 11/2002 | Kwon |
| 6,485,703 B1 * | 11/2002 | Cote et al. ............ 424/9.1 |
| 6,487,447 B1 | 11/2002 | Weimann et al. |
| 6,491,657 B2 | 12/2002 | Rowe et al. |
| 6,503,198 B1 | 1/2003 | Aronowtiz et al. |
| 6,535,753 B1 | 3/2003 | Raskas |
| 6,540,675 B2 | 4/2003 | Aceti et al. |
| 6,673,596 B1 | 1/2004 | Sayler et al. |
| 6,766,817 B2 | 7/2004 | da Silva |
| 6,887,239 B2 | 5/2005 | Elstrom et al. |
| 7,150,975 B2 * | 12/2006 | Tamada et al. ............ 435/14 |
| 2001/0017269 A1 | 8/2001 | Heller et al. |
| 2003/0027240 A1 | 2/2003 | Asher et al. |
| 2003/0100040 A1 | 5/2003 | Bonnecaze et al. |
| 2003/0100846 A1 | 5/2003 | Custer et al. |
| 2003/0232895 A1 | 12/2003 | Omidian et al. |
| 2004/0039418 A1 | 2/2004 | Elstrom et al. |
| 2004/0087671 A1 | 5/2004 | Tamada et al. |
| 2004/0167383 A1 | 8/2004 | Kim et al. |
| 2004/0171980 A1 | 9/2004 | Mitragotri et al. |
| 2004/0176672 A1 | 9/2004 | Silver et al. |
| 2004/0236268 A1 | 11/2004 | Mitragotri et al. |
| 2005/0038329 A1 * | 2/2005 | Morris et al. ............ 600/319 |
| 2006/0015058 A1 | 1/2006 | Kellogg et al. |
| 2006/0094945 A1 * | 5/2006 | Barman et al. ............ 600/347 |
| 2006/0094946 A1 * | 5/2006 | Kellogg et al. ............ 600/347 |
| 2007/0154395 A1 * | 7/2007 | Morris et al. ............ 424/9.6 |

FOREIGN PATENT DOCUMENTS

| | | |
|---|---|---|
| CA | 1324051 | 11/1993 |
| CA | 2167393 | 1/1995 |
| CA | 2226176 | 1/1997 |
| CA | 2229480 | 3/1997 |
| CA | 2212826 | 7/1997 |
| CA | 2075624 | 11/1997 |
| DE | 2756460 | 6/1979 |
| EP | 0 043 738 | 1/1982 |
| EP | 0 245 535 | 11/1987 |
| EP | 0 246 341 | 11/1987 |
| EP | 0 247 850 | 12/1987 |
| EP | 0 278 074 | 8/1988 |
| EP | 0 304 304 | 2/1989 |
| EP | 0 368 408 | 5/1990 |
| EP | 0 453 283 | 10/1991 |
| EP | 0 495 531 | 7/1992 |
| EP | 0 513 789 | 11/1992 |
| EP | 0 612 525 | 8/1994 |
| EP | 0 625 360 | 11/1994 |
| EP | 0 649 628 | 4/1995 |
| EP | 0 736 305 | 10/1996 |
| GB | 1 577 551 | 2/1977 |
| GB | 1 577 551 | 10/1980 |
| GB | 2 153 223 | 12/1984 |
| GB | 3 170 172 | 7/1991 |
| JP | 59-95060 | 5/1984 |
| JP | 62-133937 | 6/1987 |
| SU | 445 443 | 11/1974 |
| SU | 556 805 | 6/1977 |
| SU | 591186 | 1/1978 |
| SU | 506 421 | 2/1978 |
| SU | 910157 | 3/1982 |
| WO | WO 87/07295 | 12/1987 |
| WO | WO 88/00001 | 1/1988 |
| WO | WO 90/01971 | 3/1990 |

| | | |
|---|---|---|
| WO | WO 90/15568 | 12/1990 |
| WO | WO 91/12772 | 9/1991 |
| WO | WO 92/13567 | 8/1992 |
| WO | WO 94/05368 | 8/1992 |
| WO | WO 92/14449 | 9/1992 |
| WO | WO 93/05096 | 3/1993 |
| WO | WO 93/20745 | 10/1993 |
| WO | WO 94/08655 | 4/1994 |
| WO | WO 95/02357 | 1/1995 |
| WO | WO 96/00110 | 1/1996 |
| WO | WO 97/02811 | 1/1997 |
| WO | WO 97/04832 | 2/1997 |
| WO | WO 97/10499 | 3/1997 |
| WO | WO 97/13548 | 4/1997 |
| WO | WO 97/18851 | 5/1997 |
| WO | WO 97/24059 | 7/1997 |
| WO | WO 97/30628 | 8/1997 |
| WO | WO 97/30749 | 8/1997 |
| WO | WO 98/00194 | 1/1998 |
| WO | WO 98/17184 | 4/1998 |
| WO | WO 98/20331 | 5/1998 |
| WO | WO 98/28037 | 7/1998 |
| WO | WO 98/34541 | 8/1998 |
| WO | WO 98/42252 | 10/1998 |
| WO | WO 99/34857 | 7/1999 |
| WO | WO 99/34858 | 7/1999 |
| WO | WO 00/04821 | 2/2000 |
| WO | WO 00/35351 | 6/2000 |
| WO | WO 00/35357 | 6/2000 |
| WO | WO 01/70330 | 9/2001 |
| WO | WO 2006/011062 A2 * | 2/2006 |

OTHER PUBLICATIONS

Brahim S. et al. Biosmart Hydrogels: Cojoined Molecular Recognition and Signal Transduction in Biosesor Fabrication and Drug Delivery. Biosensors & Bioelectronics 17 2002 973-981.*
Kang S. et al. A Sulfonamide Based Glucose Responsive Hydrogel with Covalently Immobilized Glucose Oxidase and Catalase. J of Controlled Release 86 2003 115-121.*
Traitel T. et al. Characterization of Glucose Sensitive Insulin Release Systems in Simulated in vivo Conditions. Biomaterials 21 2000 1679-1687.*
Agrawl, C.M. et al., "The effects of ultrasound irradiation on a biodegradable 50-50% copolymer of polylactic and polyglycolic acids," 28 Journal of Biomedical Materials Research 851-859 (1994).
Albin et al., "Theoretical and Experimental Studies of Glucose Sensitive Membranes," 6 Journal of Controlled Release 267-291 (1987).
Allcock, H., et al., "Activity of Urea Amidohydrolase Immobilized within Poly[di(methoxy-ethoxyethoxy)phosphazene Hydrogels," Biomaterials, vol. 15, No. 7, pp. 502-506 (Jun. 1994).
Apfel, R. F., "Possibility of Microcavitation from Diagnostic Ultrasound," IEEE Trans. Ultrason Ferroelectrics Freq. Control UFFC 33:139-142 (1986).
Asakura et al. "Immobilization of Glucose Oxidase on Nonwoven Fabrics with Bombyx mori Silk Fibroin Gel," Journal of Applied Polymer Science, vol. 46, No. 1, pp. 49-53 (Sep. 5, 1992).
Aungst et al., "Contributions of Drug Solubilization, Partitioning, Barrier Disruption, and Solvent Permeation to the Enhancement of Skin Permeation of Various Compounds with Fatty Acids and Amines," Pharm. Res. 7:712-718 (1990).
Barry, "Mode of Action of Penetration Enhancers in Human Skin," J. Controlled Rel. 6:85-97 (1987).
Bhat, et al., "Optimization of delivery of betamethasone-dipropionate from skin preparation," Indian Drugs 32:211-14 (1995).
Blackshear, "Implantable Drug-Delivery Systems," Scientific America, p. 66-73 (604193) (Dec. 1979).
Bommer, et al., "Subcutaneous Erythropoeitin" The Lancet 406 (1988).
Boucaud et al., "Clinical, histologic, and electron microscopy study of skin exposed to low-frequency ultrasound," The Anatomical Record, vol. 264, No. 1, pp. 114-119 (Sep. 2001).

Boucaud et al., "In vitro study of low-frequency ultrasound-enhanced transdermal transport of fentanyl and caffeine across human and hairless rat skin," International J. Pharmaceuticals, vol. 228, Nos. 1-2, pp. 69-77 (Oct. 2001).
Burnette, R.R., "Iontophoresis," Transdermal Drug Delivery Development Issues and Research Initiatives 247-291 (Hadgraft and Guv. Editors, Marcel Dekker, 1989).
Burton et al., "Metabolism and Transport of Peptide Across Intestinal Mucosa," 14 Proceed. Intern. Symp. Control. Rel. Bioact. Mater 6 (Controlled Release Society, Inc. 1987).
Camel, "Ultrasound," Percutaneous Penetration Enhancers 369-382 (Eric W. Smith et al. eds. 1995).
Cleary, "Transdermal Controlled Release Systems," Medical Applications of Controlled Release 203-251 (Langer and Wise, Editors, CRCPress 1984).
Clegg and Vaz, "Translational diffusion of proteins and lipids in artificial lipid bilayer membranes, A comparison of experiment with theory," Progress in Protein-Lipid Interactions Watts, ed. Chapter 5:173-229 (Elsvier, NY 1985).
D'Emanuele, et al., "An Investigation of the Effects of Ultrasound on Degradable Polyanhydride Matrices," 25 Macromolecules 511-515 (1992).
Davis et al., "Characterization of Recombinant Human Erythropoietin Produced in Chinese Hamster Ovary Cells," Biochemistry 26:2633-2638 (1987).
Domb, et al., "Polyanhydrides-Sysnthesis and Characterization," 107 Advances in Polymer Sciences: 93-141 (1993).
Ebert et al., "Transbuccal Absorption of Diclofenac Sodium in a Dog Model," Controlled Release Technology Pharmaceutical Application 310-321 (Lee, et al. Editors, American Chemical Society, 1987).
Eggerth et al., "Evaluation of Hamster Cheek Pouch as a Model for Buccal Absorption," 14 Proceed. Intern. Symp. Rel. Bioact. Mater. 180-181 (Controlled Release Society, Inc. 1987).
Egorov, E.A. et al., "Use of the Variants of the Pharmacophysical Influence in Ophthalmology," 102 Ophthalmology Journal #2 (1992).
Elias, "The Microscopic Structure of the Epidermis and Its Derivatives," Percutaneous Absorption: Mechanisms—Methodology—Drug Delivery 1-12 (1989).
Eppstein, D.A. et al., "Alternative Delivery Systems for Peptides and Proteins as Drugs," 5 CRC Reviews in Therapeutic Drug Carrier Systems 99-139 (1988).
Eppstein, D.A. et al., "Applications of Liposome Formulations for Antimicrobial/Antiviral Therapy," Liposomes as Drug Carriers 311-323 (John Wiley & Sons 1988).
Eppstein, D.A. et al., "Medical Utility of Interferons: Approaches to Increasing Therapeutic Efficacy" 7 Pharmacy International 195-199 (1986).
Flynn, "Mechanism of Percutaneous Absorption from Physicochemical Evidence," Percutaneous Absorption: Mechanisms—Methodology—Drug Delivery, pp. 27-51 (1989).
Friedman, "Interferons: A Primer," ISBN 0-12-268280-7 (Academic Press, NY 1981).
Gaertner, W., "Frequency Dependence of Ultrasonic Cavitation," J. Acoust. Soc. Am. 26:977-980 (1954).
Ghanem et al., "The effects of ethanol on the transport of lipophilic and polar permeants across hairless mouse skin: Methods/validation of a novel approach," Int. J. Pharm. 78:137-156 (1992).
Grups and Frohmuller, "Cyclic Interferon Gamma Treatment of Patients with Metastatic Renal Carcinoma," J. Med. 64(3):218-220 (1989).
Hansch and Leo, "Substitutent Constants for Correlation Analysis in Chemistry and Biology" (1979).
Heller, J., et al. "Controlled Drug Release by Polymer Dissolution II Enzyme-Mediated Delivery Device," Journal of Pharmaceutical Sciences, vol. 68, No. 7, pp. 919-921 (Jul. 1979).
Hill-West et al. (1994) Inhibition of thrombosis and intimal thickening after balloon injury by in situ polymerization of thin hydrogel barriers. PNAS USA 91: 5967-71.
Johnson et al., "Synergistic Effects of Chemical Enhancers and Therapeutic Ultrasound on Transdermal Drug Delivery," 85 J. Pharmaceutical Science 670-679 (Jul. 1996).

Junginger et al., "Visualization of Drug Transport Across Human Skin and the Influence of Penetration Enhancers," Drug Permeation Enhancement 59-89 (1994).

Kamath, et al., "Biodegradable hydrogels in Drug Delivery," 11 Advanced Drug Delivery Reviews 59-84 (1993).

Kasting et al., "Prodrugs for Dermal Delivery: Solubility, Molecular Size, and Functional Group Effects," Prodrugs: Topical and Ocular Delivery 117-161 (1992).

Keith and W. Snipes, "Polymeric Carriers for Active Agents," Transdermal and Related Drug Delivery Systems pp. 223-279 (D.A. Jones ed. 1984).

Kost and Langer, "Ultrasound-Mediated Transdermal Drug Delivery," Topical Drug Bioavailability Bioequivalence and Penetration 91-104 (1993).

Kost et al., "Ultrasound Effect of Transdermal Drug Delivery," Ben Gurion University, Dept. of Chem. Engineering, Beer Sheva Israel MIT, Dept. of Applied Biological Sciences, Cambridge, MA, no date given.

Kost, J., et al., "Glucose-Sensitive Membranes Containing Glucose Oxidase: Activity, Swelling, and Permeability Studies," Journal of Biomedical Materials Research, vol. 19, pp. 1117-1133 (1985).

Krall, "World Book of Diabetes in Practice," vol. 3, pp. 2-7 (Elsvier, 1988).

Langer et al., "Chemical and Physical Structure of Polymers as Carriers for Controlled Release of Bioactive Agents: A Review," Journal of Macromolecular Science, Reviews on Macromolecular Chemistry and Physics, C23(1), 61-126 (1983).

Lee & Rashi, "Nasal Peptide and Protein Absorption Promotors: Aminopeptidase Inhibition as a Predictor of Absorption Enhancement Potency of Bile Salts," Proceed. Intern. Symp. Control. Rel. Bioact. Mater. 14, 53-54 (1987).

Lee et al., "Protease Inhibition as an Additional Mechanism for the Nasal Absorpotion Enhancement Effect of Sodium Taurodihydrofusidate," Proceed. Intern. Symp. Control. Rel. Bioact. Mater. 14, 55-56 (1987).

Lesho et al., "A Photopatterned Glucose Responsive Hydrogel for Use in a Conductimetric Sensor," Biomaterials for Drug and Cell Delivery, Materials Research Society Symposium Proceedings, vol. 331, pp. 193-198 (1994).

Levy et al., "Effect of Ultrasound on Transdermal Drug Delivery to Rats and Guinea Pigs," J. Clin. Invest. 83:2074-2078 (1989).

Liu et al., "Experimental Approach To Elucidate the Mechanism of Ultrasound-Enhanced Polymer Erosion and Release of Incorporated Substances," 25 Macromolecules 123-128 (1992).

Liu, et al., "Cotransport of Estradiol and Ethanol Through Human Skin in Vitro: Understanding the Permeant/Enhancer Flux Relationship," Pharmaceutical Research 8:938-944 (1991).

Machluf and Kost, "Ultrasonically enhanced transdermal drug delivery, Experimental approaches to elucidate the mechanism," J. Biomater. Sci. Polymer Edn. 5:147-156 (1993).

Mak et al., "Oleic Acid Concentration and Effect in Human Stratum Corneum: Non-Invasive Determination by Attenuated Total Reflectance Infrared Spectroscopy In Vivo,": J. Controlled Rel. 12:67-75 (1990).

Merriam-Webster's Collegiate Dictionary (2001) Merriam-Webster Inc. 10th Ed. 250.

Mezei, Michael, "Liposomes as a Skin Drug Delivery System," Topics in Pharmaceutical Sciences pp. 345-357 (1985).

Mitragotri et al., "A Mechanistic Study of Ultrasonically-Enhanced Transdermal Drug Delivery," J. Pharm. Sci. vol. 84, No. 6, pp. 697-706 (1995).

Mitragotri et al., "Ultrasound-Mediated Transdermal Protein Delivery," Science 269:850-853 (Aug. 11, 1995).

Mitragotri et al., "Sonophoresis: Enhanced Transdermal Drug Delivery by Application of Ultrasound,"14 Encyclopedia of Pharmaceutical Technology 103-122 (1996).

Mitragotri, S. et al., "Synergistic Effect of Low-frequency Ultrasound and Sodium Lauryl Sulfate on Transdermal Transport," J. Pharm. Sci. vol. 89, No. 7, pp. 892-900 (2000).

Mitragotri, "Synergistic Effect of Enhancers for Transdermal Drug Delivery," Pharm Res. vol. 17, No. 11, pp. 1354-1359 (2000).

Mitragotri and Joseph Kost, "Transdermal Delivery of Heparin and Low-Molecular Weight Heparin Using Low-Frequency Ultrasound," Pharmaceutical Research, vol. 18, No. 8, pp. 1151-1156 (Aug. 2001).

Miyazaki, et al., "Controlled Drug Release by Ultrasound Irradiation," Chemical & Pharmaceutical Bulletin, 33(1), pp. 428-431 (1985).

Monti et al., "Comparison of the effect of ultrasound of chemical enhancers on transdermal permeation of caffeine and morphine through hairless mouse skin in vitro," International J. Pharmaceuticals, vol. 229, Nos. 1-2, pp. 131-137 (Oct. 2001).

Moriomoto et al., "Prediction of Skin Permeability of Drugs: Comparison of Human and Hairless Rat Skin," J. Pharm. Pharmacol. 44:634-639 (1991).

Murav'ev et al., "Mechanism of the Release of Pharmaceutical Substances from Ointment Bases by Ultrasound", Chemical Abstracts, vol. 84, No. 4, Jan. 26, 1976, p. 333, Abstract No. 22054g (Jan. 26, 1996).

Nagai et al., "Buccaal/Gingival Drug Delivery Systems," Journal of Controlled Release 6:353-360 (1987).

Newman et al., "Hydrocortisone Phonophoresis," J. Am. Pod. Med. Assoc. 82:432-435 (1992).

Olanoff and Gibson, "Method to Enhance Intranasal Peptide Delivery," Controlled Release Technology Pharmaceutical Application 301-309 (1987).

Ongpipattanankul et al., "Evidence that Oleic Acid Exists in a Separate Phase Within Stratum Corneum Lipids," Pharm. Res. 8:350-354 (1991).

Otsuka, et al., "Use of Ultrasonic Waves in Pharmacy—I&II. Degradation of Polymers," Chemical Abstracts, vol. 69, No. 20, pp. 7513, Abstract No. 80161r & No. 80162 (Nov. 11, 1968).

"Pharmaceutical Sciences," Chapter 19—Disperse Systems pp. 267-272 Chapter 87—Medicated Applications pp. 1600-1606, 1614 Chapter 91—Sustained-Release Drug Delivery Systems pp. 1690-1693, Mack Publishing Co, Easton PA (1990).

Pishko et al., "Amperometric Glucose Microelectrodes Prepared through Immobilization of Glucose Oxidase in Redox Hydrogels," Anal. Chem. 63:2268-2272 (1991).

Potts and Guy, "Predicting Skin Permeability," Pharm. Res. 9:663-669 (1992).

Prausnitz et al., "Electroporation of mammalian skin: A mechanism to enhance transdermal drug delivery," 90 Proc. Natl. Acad. Sci. USA 10504-10508 (Nov. 15, 1993).

Quillen, "Phonophoresis: A Review of the Literature and Technique," Athletic Training 15:109-110 (1980).

Robinson & Lee, "Influence of Drug Properties on Design," Controlled Drug Delivery 42-43, incomplete citation.

Rosell et al., "Skin Impedance from 1 Hz to 1 MHz," IEEE Trans. Biomed. Eng. 35:649-651 (1988).

Schreier & Bouwstra, "Liposomes and noisomes as topical drug carriers: dermal and transdermal drug delivery," 30 Journal of Controlled Release 1-15 (1994).

Skauen & Zentner, "Phonophoresis," Int. J. Pharm. 20, 235-245 (1984).

Stringfellow, "Clinical Applications of Interferons and Their Inducers," (Marcel Dekker ed., 2d ed. 1986).

Tamada et al., "Correlation of Blood Glucose With Iontophoretic Glucose Flux in Human Subjects for Glucose Monitoring," Proceed. Intern. Symp. Control. Rel. Bioact. Mater. 22, 129-130 (1995).

Tang, H. et al., "Theoretical description of transdermal transport of hydrophilic permeants: applications to low-frequency sonophoresis," 90 J. Pharmaceutical Sciences 545-568 (Mar. 28, 2001).

Tezel et al., "Synergistic Effect of Low-Frequency Ultrasound and Surfactants on Skin Permeability," J. Pharmaceutical Sciences, vol. 91, No. 1, pp. 91-100 (Jan. 2002).

Tocanne et al., "Lipid lateral diffusion and membrane organization," FEBS Letters, vol. 257, pp. 10-16 (1989).

Tyle and Agrawala, "Drug Delivery by Phonophoresis," Pharm. Res. 6:355-361 (1989).

Veillard et al., "Buccal Controlled Delivery of Peptides," 14 Proceed. Intern. Symp. Control. Rel. Bioact. Mater 22 (Controlled Release Society, Inc. 1987).

Walker and Hadgraft, "Oleic Acid—a membrane 'fluidiser' or fluid within the membrane," Int. J. Pharm. 71:R1-R4 (1991).

Walmsley, "Applications of Ultrasound in Dentistry," Ultrasound in Med. and Biol. 14:7-14 (1988).

Walters, K.A., "Penetration Enhancers and Their Use in Transdermal Therapeutic Systems," Transdermal Drug Delivery: Developmental Issues and Research Initiatives, 197-246 (Hadgraft et al. eds. 1989).

Wester and Mailbach, "Animal Models for Percutaneous Absorption," Topical Drug Bioavailability Bioequivalence and Penetration 333-349 (1993).

Wheatley et al., "Use of Ussing Chamber for Investigation of Drug Delivery Across Viable Nasal Tissue Membranes," 14 Proceed. Intern. Symp. Rel. Bioact. Mater. 26-27 (Controlled Release Society, Inc. 1987).

Williams et al., "On the non-Gaussian distribution of human skin permeabilities," 86 Int. J. Pharm. 69-77 (1992).

Wilschut et al., "Estimating Skin Permeation. The Validation of Five Mathematical Skin Permeation Models," Chemosphere 30:1275-1296 (1995).

* cited by examiner

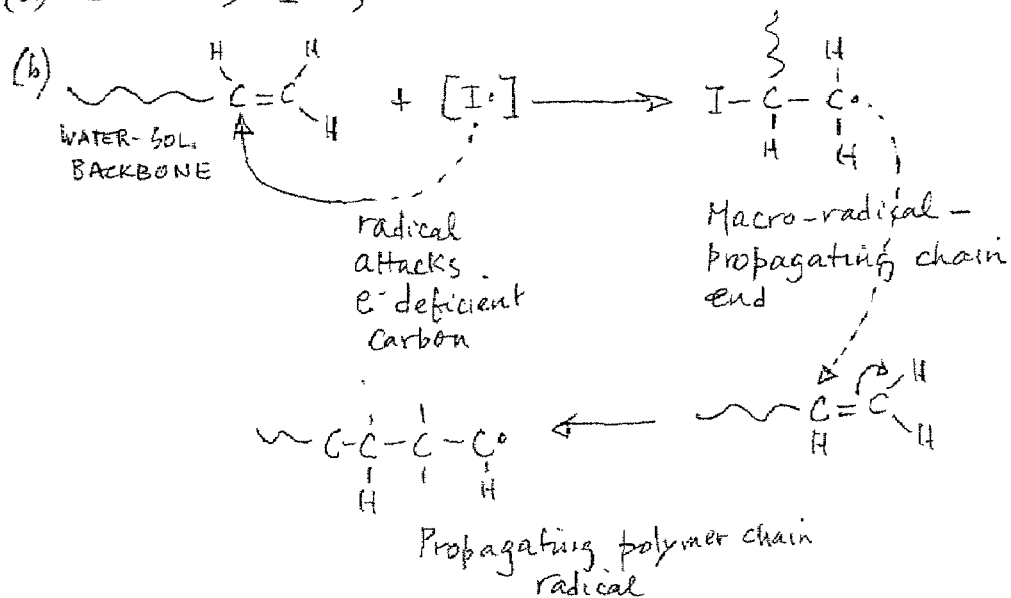
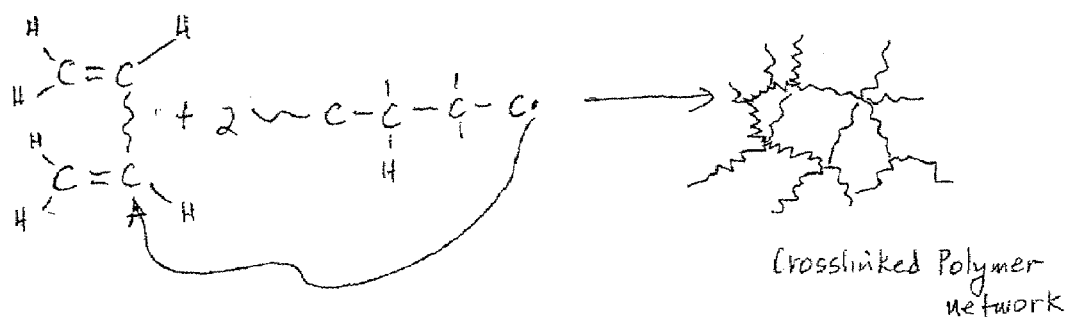
Figure 1: Photocrosslinking Scheme

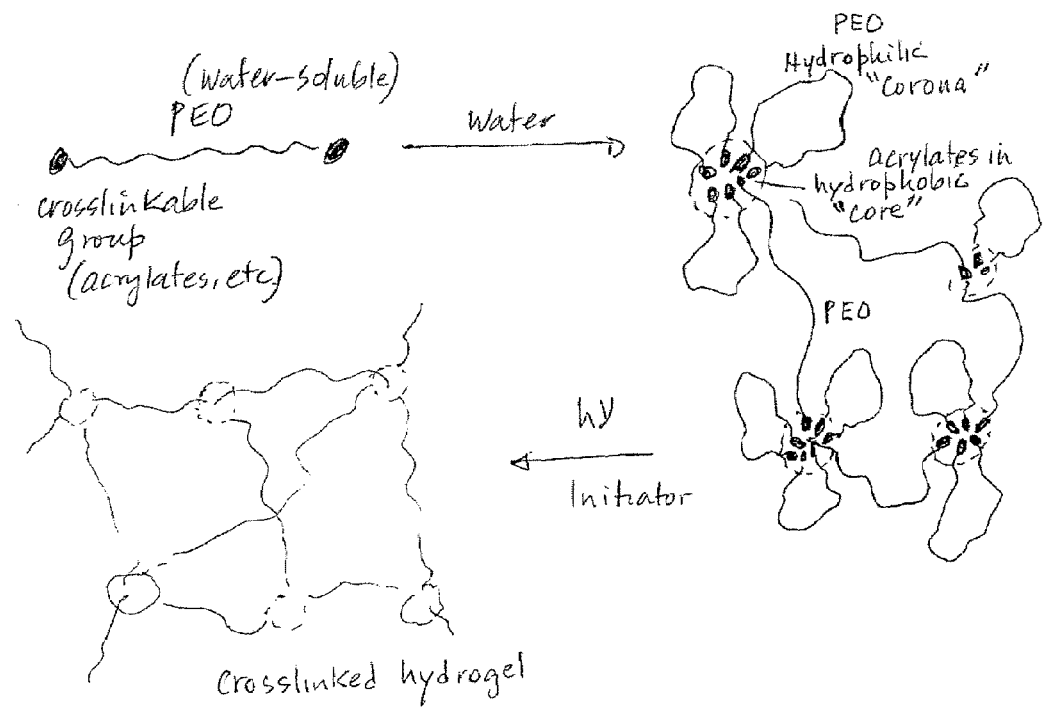
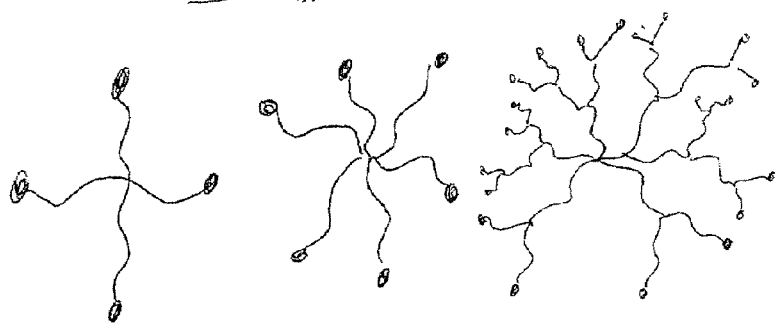
Figure 2: Free-Radical Micellar Polymerization

Potentiometric testing on 10% w/v (pink squares) and 15% w/v (black triangles) hydrogels, containing GOx.

BIOCOMPATIBLE CHEMICALLY CROSSLINKED HYDROGELS FOR GLUCOSE SENSING

BACKGROUND OF THE INVENTION (i) Field of the Invention

The present invention relates to novel hydrogels, methods of manufacturing hydrogels, and their use in connection with applications such as glucose monitoring.

(ii) Description of the Related Art

Diabetics frequently prick their fingers and forearms to obtain blood in order to monitor their blood glucose concentration. This practice of using blood to perform frequent monitoring can be painful and inconvenient. New methods of sampling body fluids that are more convenient and less painful have emerged which rely on transdermal transport of analyte molecules. One type of transdermal glucose sensor detects glucose permeating through a patient's skin (usually after a preparation treatment to increase skin permeability) by exposing glucose to the enzyme glucose oxidase (GOx) which forms hydrogen peroxide upon contact with glucose. The hydrogen peroxide is then measured electrochemically to determine the blood glucose concentration.

A need therefore exists for interface materials that can transport analyte molecules from the skin interface to the sensor interface in a manner that permits continuous, real-time monitoring of analyte concentrations within the patient in an efficient and reliable manner.

SUMMARY OF THE INVENTION

Embodiments of this invention involve the design attributes of a skin-contacting hydrogel that can serve as a reservoir for a biologically active component in transdermal glucose sensing applications. Also disclosed are products, compositions, and methods that result in improved sensor technology in general. Certain embodiments of the present invention provide for advantageous glucose oxidase-containing hydrogel systems that further enable and improve continuous monitoring of blood glucose levels, particularly when applied as part of a sensing assembly that is placed on a patient's skin after permeation of the skin with SonoPrep.

Embodiments of the invention are directed to a hydrogel comprising a crosslinked gel structure and a biologically active component incorporated into the crosslinked gel structure, the biologically active component being capable of converting glucose into a compound having potentiometric activity, wherein the hydrogel is obtained from a macromer solution comprising: a macromer comprising at least one hydrophilic polymeric block that is end-terminated with at least one reactive group; an initiator; and a biologically active component.

Embodiments of the invention are directed to a hydrogel comprising a crosslinked gel structure and a biologically active component incorporated into the crosslinked gel structure, the incorporated biologically active component being capable of converting glucose into a compound having potentiometric activity, wherein at least 60% of the bioactivity of the incorporated biologically active molecule is maintained when measured by potentiometry over seventeen consecutive additions of glucose at a concentration of 2.5 mg/dL with eight minutes elapsing between each consecutive addition of glucose, wherein the hydrogel retains moisture such that it maintains at least 60% of its fully hydrated weight after contact with skin for a period of 24 hours, and wherein the hydrogel swells at least about 15% after soaking in phosphate buffered saline for 15 minutes and swells less than about 30% after soaking in phosphate buffered saline for 12 hours.

Embodiments of the invention are directed to a method of making a hydrogel comprising the steps of: providing a macromer solution comprising: a macromer which comprises at least one hydrophilic polymeric block that is end-terminated with at least one reactive group, an initiator, and a biologically active component; and crosslinking the macromer solution to form a hydrogel which comprises a crosslinked gel structure and a biologically active component incorporated into the crosslinked gel structure, the incorporated biologically active component being capable of converting glucose into a compound having potentiometric activity.

Embodiments of the invention are directed to an aerogel or a dried hydrogel obtained by drying a hydrogel incorporating a biologically active component.

Embodiments of the invention are directed to a membrane for transdermal monitoring comprising the hydrogel incorporating a biologically active component. The mesh structure may comprise a layer of scrim.

Embodiments of the invention are directed to a hydrogel component comprising: a first release layer; a first double-sided adhesive layer; a hydrogel layer comprising a crosslinked gel structure and a biologically active component incorporated into the crosslinked gel structure; a second double-sided adhesive; and a second release liner, wherein the first double-sided adhesive layer is between the first release layer and the hydrogel layer and the second double-sided adhesive layer is between the hydrogel layer and the second release liner.

Embodiments of the invention are directed to a method of making a hydrogel component comprising the steps of: providing a first release liner and a second release liner; providing a macromer solution comprising a biologically active component between the first release liner and the second release liner; and applying light to the macromer solution between the first release liner and the second release liner to photopolymerize the macromer solution and form a hydrogel comprising a crosslinked gel structure with the biologically active component incorporated into the crosslinked gel structure.

LIST OF FIGURES

FIG. 1 is a diagram of the photopolymerization chemistry for free radical crosslinking of PEG-diacrylate;

FIG. 2 is a diagram of the aqueous micellar free-radical polymerization of PEG-diacrylate;

DETAILED DESCRIPTION OF THE INVENTION

Figure 3A:
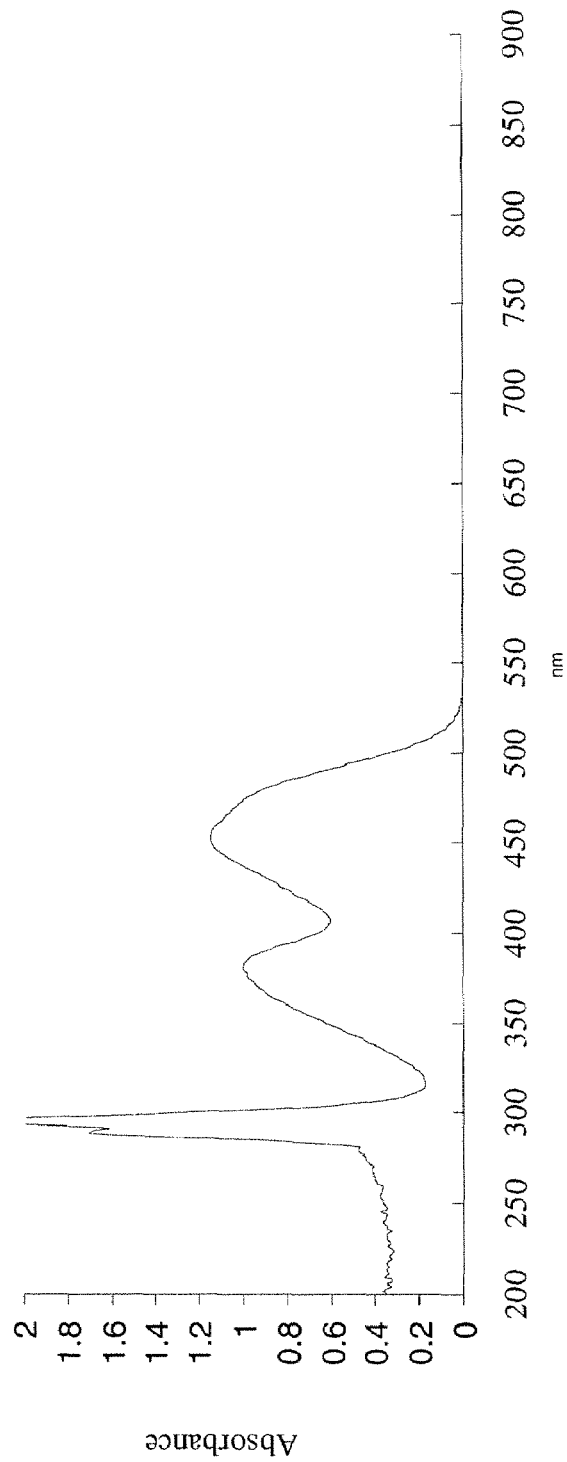
FIG. 3A is an absorbance spectrum for glucose oxidase (1% w/v) in phosphate buffered saline.

The preferred embodiments of the present invention and their advantages are best understood by referring to FIGS. 1 through 9 of the drawings, like numerals being used for like and corresponding parts of the various drawings.

The terms "polyethylene glycol" and "polyethylene oxide" are used interchangeably throughout this disclosure.

The term "macromer" means a polymerization precursor that is not necessarily a monomer in a strict sense, but includes polymers that can be further polymerized to form a gel or hydrogel structure. A macromer solution is capable of gelling or covalently cross-linking to produce a hydrogel and contains macromer as well as other desired reactants and/or components.

Applicants have recognized that interface material having one or more of the characteristics of being compatible with tissue, non-immunogenic (and thus non-allergenic), hydrophilic, compatible with enzymes used in analyte detection, and capable of having desired gel attributes are would be desirable for transdermal glucose monitoring. It was found that hydrogels capable of fulfilling these needs may be manufactured using one or more of the techniques and/or processes disclosed herein. The present inventors have found that certain parameters are important in the design of such hydrogels, including: (a) the chemical compatibility of macromer (i.e., pre-hydrogel polymer) with particular enzymes (e.g., glucose oxidase), (b) the compatibility of the cross-linking chemistry with the enzyme, (c) the non-allergenicity of the skin-contacting gel surface, (d) the non-adherence of proteins in the interstitial fluid to the hydrogel and prevention of biofouling, (e) the sufficiency of gel integrity of the enzyme-containing hydrogel for accomplishing at least 24 hours of sensor-gel skin contact, (f) the sufficiency of the gel matrix density for preventing leaching of the incorporated enzyme during washing and storage procedures, (g) the ability to "load" the hydrogel with an excess of enzyme (e.g., glucose oxidase) relative to the analyte of interest (e.g., glucose) to be sensed in a particular application, (h) the stability of the enzyme-containing hydrogel over durations in excess of 6 months or more, (i) the ability to retain a high percentage of water to ensure diffusibility of the soluble enzyme and (j) the ability to retain water for 24 hours on skin to maintain solubility and bioavailability of the enzyme for the duration of the test, (k) the ability to utilize high purity materials (e.g. synthetic materials) that are free from contaminants that may reduce the signal to noise ratio as measured by potentiometry, (l) the non-reactivity of the hydrogel with chemicals such as hydrogen peroxide that may be present in particular sensing applications, and (m) the permeability of the hydrogel to analyte and other components such as glucose and hydrogen peroxide that may be present in particular sensing applications. Some or all of the functional characteristics of the hydrogel-enzyme composite as described above may be achieved using the polymer compositions described herein.

Hydrogels according to the present invention are capable of incorporating within the gel matrix one or more biologically active proteins or enzymes at levels that enable their use in measurement and sensing applications. For example, a PEG based hydrogel formed by crosslinked polyethylene glycol diacrylate (PEGDA) and incorporating glucose oxidase at levels that enable detection and continuous monitoring of blood glucose levels through transdermal sensing technology is disclosed. The hydrogels of the present invention have one or more, and preferably all, of the following properties: high water content, stability, strength, good skin adhesion, and a crosslinking chemistry that is capable of incorporating active biological agents into the hydrogel.

The polymerization reaction used to form the above mentioned hydrogels is desirably conducted in a manner that avoids prolonged exposure of the protein to denaturing or deactivating conditions such as heat, light, and/or chemical exposure. It is desirable to control the amount of heat, light, and/or chemicals that the protein to be incorporated is exposed to as well as duration of such exposure to maximize the likelihood of incorporating sufficient active protein into the hydrogel. While not wishing to be bound to any particular theory or reaction mechanism, one particularly desirable polymerization process that provides for control of the polymerization reaction during hydrogel formation can be characterized as free-radical water-dispersed macromer polymerization as shown in FIG. 1. Free-radical water-dispersed macromer polymerization is exemplified by PEGDA photo-polymerization described herein.

Free-radical water-dispersed macromer polymerization comprises photo-initiation of an initiator using radiation that is compatible with the initiator chemistry (e.g., ultraviolet, gamma irradiation) in the presence of a macromer in an aqueous macromer solution including a component (e.g. an enzyme or protein) to be incorporated into the hydrogel. Macromers that form micelles in water, whereby hydrophobic reactive groups occupy primarily the "core" of the micelle and hydrophilic segments are distributed primarily in the "corona" on the exterior of the micelle as shown in FIG. 2. It is believed that PEGDA forms micelles in water with the hydrophobic double bonds of the diacrylate groups occupying the core of the micelle and the hydrophilic polyethylene glycol groups being distributed in the corona region. During the crosslinking reaction, the highly reactive, electron-deficient free radicals first "attack" or react with the electron-dense reactive groups present in the core of the micelles forming crosslinks, then the reaction proceeds outwardly toward the corona via chain propagation to form a hydrogel. A glucose oxidase incorporated hydrogel may be formed using a PEGDA macromer with Irgacure 2959 initiator using far UV radiation at 365 nm in accordance with this mechanism. The properties of the hydrogel, such as gel strength and network density, can be "dialed-in" based on criteria for the desired gel attributes by varying the composition and/or polymerization reaction conditions as described herein.

The present inventors have found that PEG-multifunctional acrylates have sufficiently rapid polymerization kinetics when polymerized with free-radical water-dispersed macromer polymerization to permit incorporation of active glucose oxidase into the hydrogel. To ensure that the process for forming the hydrogel is not destructive to the incorporated protein or enzyme, the crosslinking chemistry must not be excessively exothermic and/or must be carried out in a manner that does not permit heat generated during the crosslinking to denature the incorporated protein or enzyme. Structurally, PEG is extremely hydrophilic and has a high degree of salvation in water-based solvents. Since the macromer solution is comprised of greater than 80% water, heat produced by the cross-linking reaction has a minimal effect on the glucose oxidase incorporated into the hydrogel. Additionally, PEG macromers are capable of promoting efficient photopolymerization while being relatively free of components that would compete with crosslinking moieties by absorbing light, thereby minimizing the photoexposure duration and thus the likelihood that incorporated enzymes will be denatured.

The present inventors have found that the release rate of bioactive molecules incorporated into the PEG-based hydrogels can be modulated by altering the molecular weight and/or structure of the PEG backbone. For example, increasing the molecular weight of the polyethylene oxide backbone increases the network mesh size, thereby decreasing the network density. The release rate of incorporated enzymes can be controlled by modulating the network density of the hydrogel. Therefore, a hydrogel comprised of PEGs having a molecular weight of 8K Daltons has a higher rate of release of an incorporated enzyme than a hydrogel comprised of PEGs of molecular weight 3.3K Daltons. The rate of diffusion of the glucose oxidase from the hydrogel can be controlled by varying the functionality of the PEG acrylate. For example, glucose oxidase would diffuse slower from a hydrogel constructed with PEG 4-arm-acrylate than from one constructed with PEG 2-arm-acrylate. Other functionalities for polyethylene oxide macromer include dendrimer PEGs (e.g., dendritic PEG-acrylates), star PEGs (e.g., star PEG-acrylates), or straight chain PEGs. The rate of diffusibility of glucose oxidase may be appropriately controlled by modulating the network density by varying the number of crosslinking groups. In addition, the molecular weight of macromer backbone can be varied to modulate the crosslink density of the network.

The present inventors have found that PEG-based hydrogels are advantageous for transdermal sensing applications due to their ability to achieve enhanced bioadhesive skin contact, which is a desirable attribute, particularly in applications where the hydrogel is to be placed directly on ultrasound-permeated skin. To achieve enhanced bioadhesive skin contact, the hydrogel composition can be varied to provide groups which form adhesive bonds with skin. In one example, the macromer solution can comprise PEG macromer and a photoreactive monomer that will yield a bioadhesive hydrogel after crosslinking. Exemplary macromer compositions resulting in bioadhesive hydrogels include n-vinyl acetate or n-vinyl acrylic acid copolymerized with PEG multi-aciylate to form a copolymeric compositions of PEG, poly(vinyl acetate) and poly(acrylic acid) to form interpenetrating networks (IPNs). The hydrogel can also be obtained from a PEG macromer and a noncrosslinkable polymer such as polyacrylic acid to form "semi-interpenetrating networks" (semi-IPNs). Additionally, chemically crosslinked PEG-lactate diacrylate, and PEG-trimethylene carbonate-diacrylate hydrogels could also be used as they have been utilized as biodegradable tissue sealants (e.g., dural sealant, lung sealant) and to reduce post-surgical adhesion prevention. Another method to impart adhesive qualities to the hydrogel would be to "coat" the hydrogel surface with an adhesive polymer such polyacrylic acid or polymethacrylic acid.

The present inventors have found that PEG-multifunctional acrylates are generally tissue compatible, non-immunogenic, and non-allergenic, while having low adhesion to cells and/or proteins. One of the primary reasons behind their biocompatibility is the rejection of protein and cell adhesion by the PEG-based surfaces. Additionally, extensive biocompatibility testing has been performed on polyethylene oxide based hydrogels, demonstrating excellent tissue compatibility, minimal inflammatory responses, thrombosis, and tissue damage.

Other reactive functionalities may be used instead of acrylates, such as methacrylates, di-isocyanates, etc. The macromer may comprise polymers having a cross-linkable group is selected from the group consisting of an ethylenically unsaturated group, an epoxide, an isocyanate, an isothiocyanate, an aldehyde, an amine, a sulfonic acid and a carboxylic acid.

Other polyethylene oxides that are end-terminated with acrylates may be utilized as well as macromers other than PEG-based polymers that have some or all of the desired properties for forming hydrogels. The macromer may comprise hydrophilic polymeric blocks with end-terminated reactive groups wherein the hydrophilic blocks are the same or different and are selected among poly(ethylene glycol), poly (ethylene oxide), poly(vinyl alcohol), poly(vinylpyrrolidone), poly(ethyloxazoline), a polysaccharide and an amino acid polymer. The macromer may be difunctional and/or multifunctional (>2 macromers), and tri-, tetra-, penta-, star, dendritic or branched macromers. The macromer may be preferably selected to have a molecular weight lower than 8K Daltons and at least 500 Daltons, more preferably at least 2K Daltons, and most preferably about 3.4K Daltons. The macromer may be a single crosslinkable polymer or a blend of multiple polymers with crosslinkable groups such as a blend of dendrimer PEG-acrylate and PEG-diacrylate. The macromer is desirably comprised of segments that are non cell-adherent, resistant to protein adsorption, or non-fouling, and may have at least two cross-linkable groups, may be terminated by cross-linkable groups, and/or may have interspersed crosslinkable groups. The macromer may be selected to be capable of absorbing at least about 5% by weight of water. The macromer may be synthesized using toluene as the solvent, wherein some volume of toluene is azeotroped off to remove all water from the synthesis vessel. The macromer desirably has at least 90% end-capping with the cross-linkable groups such as acrylates or isocyanates. Most preferably, the macromer has 95% end capping, which promotes fast, efficient gelation. The hydrogel-forming macromer desirably has the capacity to load adequate concentrations of bioactive glucose oxidase into the crosslinked hydrogel.

Inhibitors such as hydroquinone (HQ) or alternatively methyoxyhydroquinone are typically added to the dry macromer to prevent spontaneous crosslinking during storage. The present inventors have found that the level of inhibitor in the dry macromer should be controlled, since higher levels of inhibitor can slow down the polymerization kinetics and lengthen the polymerization step, which increases the likelihood that incorporated enzymes will be denatured. Thus, a macromer having low inhibitor content should be chosen where feasible. For example, where hydroquinone is used as an inhibitor, its concentration in the macromer should not exceed 500 ppm although inhibitor concentrations below 25 ppm may result in spontaneous crosslinking thereby making storage and transportation difficult. Therefore, the inhibitor content of the dry macromer is desirably less than 500 ppm and greater than about 10 ppm, and preferably within the range or about 25 to 500 ppm.

The present inventors found that, in addition to the degree of end-capping, the level of photoinitiator in the macromer solution affects the reaction rate of photopolymerization. With higher initiator concentration, the quantity of propagating chains for polymerization in the macromer solution increases. However, a large concentration of initiating radicals may also enhance chain termination which generally inhibits gel formation. Indeed, one way to decrease the network density is to increase the initiator concentration above a certain level. At the same time, a low initiator concentration generally necessitates longer photoexposure, which can denature glucose oxidase. In the case of Irgacure 2959 being used with macromers having a degree of end-capping that exceeds 95%, the initiator concentration is preferably below 2500 ppm to achieve adequate gel formation and enzyme activity after photopolymerization.

Embodiments of the invention include using a macromer that is capable of being photocrosslinked in both UV and visible light such as Irgacure 2959. In embodiments where the macromer solution is capable of being thermally crosslinked, an initiator such as AIBN may be used. In embodiments where the macromer solution is capable of being crosslinked by ionizing radiation, gamma radiation may be used. In any case, the amount of initiator must be balanced to achieve adequate gel formation and enzyme activity after photopolymerization.

The hydrogel may contain excipients that impart adhesiveness to skin, water-absorbing and water-retaining capabilities, plasticizing capabilities, added gel strength, modulable release characteristics of the incorporated protein, a non-biofouling surface, and protection to glucose oxidase degradation and enhanced skin compatibility. Small molecule excipients such as sodium lauryl sulfate, n-vinyl acetate, acetic acid, sodium chloride, phosphates or trehalose may be incorporated into the hydrogel. The excipient incorporated in the hydrogel may be polymeric, such as polyacrylic acid, chitosan, hyaluronic acid, PEG, mPEG-monoacrylate, polyethyleneimine, dendritic polyethyleneimine (PEI), poly(amidoamine) (PAMAM), carboxymethycellulose (CMC), poly (vinyl pyrrolidone)(PVP), poly(vinyl acetate) (PVAc), poly (2-acrylamide-2-methyl-1-propane-sulfonic acid) (PMP), sorbitans, Tweens, Spans, derivatized PEGs. The hydrogel may form an interpenetrating network (IPN) wherein all incorporated polymeric components react to form the crosslinked network, or it may form a semi-interpenetrating network, wherein only a portion of the polymeric excipients in the macromer solution participate in formation of the network.

The glucose-oxidase containing hydrogel may exist in a "dry state" (e.g., an aerogel) to extend the lifetime of the incorporated protein, particularly during storage. In the drying process, water evaporates from the gel and the surface tension causes the gel body to collapse. The gel may then be dried into a thin, flexible film. Formation of such flexible films may be promoted by incorporation of polymeric plasticizers such as polyethylene glycols, lipid-derivatized PEGs, PEGs, sorbitans, etc. into the hydrogel. The dried glucose oxidase incorporated hydrogel may be reconstituted shortly before use by hydration with an appropriate hydrating agent. One example of a hydrating agent useful for reconstituting a dried hydrogel is phosphate buffered saline (PBS).

Glucose oxidase incorporated hydrogels can be mounted on a gel mesh, or "scrim" to aid in packaging with the glucose sensor, or they may be in the form of a free-standing gel that does not require a support mesh or scrim. The hydrogel may also be packaged and stored separately from the sensor in, for instance, a contact lens format. Alternatively, the hydrogel may be photo-polymerized directly on the sensor electrode. The examples described herein, describe the method of fabrication of the hydrogels, method of assembling into gel-scrim formats, methods of characterization and proof-of-principle experiments that demonstrate that the hydrogels of the present invention function adequately in continuous transdermal glucose monitoring applications.

The bulk properties of the hydrogel control its end properties, such as diffusibility of analyte and glucose into the network. For a hydrogel that contains glucose oxidase, factors that control the network density of the hydrogel are desirably adjusted and balanced to allow for sufficient gel strength and yet provide full accessibility of the glucose molecules to the hydrogel-incorporated enzyme. The crosslink density or mesh size of the hydrogel network is dependent upon the molecular weight of the macromonomer (PEGDA) and its concentration in solution as well as reaction conditions used to crosslink the macromer to form a hydrogel as discussed above. The method to synthesize the hydrogel desirably enables maintaining the structural integrity and bioactivity of the incorporated glucose oxidase. The GOx-containing crosslinked hydrogel when placed on the skin as part of a glucose sensing apparatus should retain moisture for at least 24 hours. The GOx-containing crosslinked hydrogel may increase in gel thickness by at least 10%.

The hydrogel will be utilized as a "reservoir" for glucose oxidase by placing on skin or ultrasound permeated skin (SonoPrep) as part of a glucose sensor assembly for the purpose of continuously sensing glucose concentrations in blood. 10% and 15% w/v PEGDA hydrogels were photopolymerized to completion in 30 seconds of UV light exposure. As mentioned previously, the rate of polymerization is directly proportional to the intensity of light. Glucose oxidase was successfully incorporated in 15% hydrogels in input concentrations of 0.5-3% w/v of enzyme. However, when GOx concentrations in the macromonomer (e.g., PEGDA) are greater than 3%, the macromer solution becomes turbid. The resultant turbidity indicates that GOx is insoluble in the medium at concentrations greater than 3%. Amphilphilic polymers may be added to the macromer solution to enhance solubility of GOx in the macromer solution.

EXAMPLE 1

Hydrogels were prepared using 15% w/v PEGDA having a molecular weight of 3.4K. The hydrogels according to this example were formulated for optimal continuous monitoring of glucose and are capable of incorporating proteins and enzymes within the crosslinked gel matrix. In this example, glucose oxidase was incorporated within the gel matrix of the crosslinked hydrogel. Incorporation of glucose oxidase within the gel matrix of the crosslinked hydrogel was successfully achieved by appropriate selection of macromer, macromer concentration, appropriate levels of hydroquinone, extent of acrylation, intensity of light, and duration of photopolymerization.

A stock solution of 20% w/v glucose oxidase ("stock GOx") was prepared by adding 200 mg of glucose oxidase (*Aspergillus niger*, Code GO3AC, Biozyme Laboratories, San Diego, Calif.) to a 4 ml glass scintillation vial and adding 800 µl of 10 mM phosphate buffered saline (PBS) solution via pipette. The 10 mM PBS having a pH of about 7.0 was prepared by adding 1 tablet of phosphate buffered saline (#P3030, Spectrum, New Brunswick, N.J.) per 100 ml of de-ionized water. The stock GOx was allowed to mix on a magnetic stir plate for about 20 minutes at room temperature and examined for clarity. The stock GOx may be stored for up to 2 weeks at 4° C. before use.

A solution of PEGDA was prepared by adding 450 mg PEGDA (M.W. 3.4K, Cat#P2AC, Sunbio, Anyand City, South Korea) to a 20 ml glass scintillation vial along with 600 µl of the 10 mM PBS prepared above.

A photoinitiator solution of 1000 ppm Irgacure was prepared by adding 40 mg Irgacure 2959 (#3406H1, Ciba Chemical, Tarrytown, N.Y.) to 40 ml PBS in a 100 ml Erlenmeyer flask covered with aluminum foil to prevent yellowing. The photoinitiator solution was stirred for approximately 1 hour at 50-60° C. and visually examined for clarity and absence of particulate to ensure complete dissolution. The concentration of the photoinitiator solution was controlled to 1000±50 ppm Irgacure. Control of initiator concentration is desirable to control chain termination, which can be brought about by a high concentration of initiator radicals. A standard curve was constructed at 0, 300, 450, 500, 1000, 1500 ppm Irgacure in PBS so that concentration of photoinitiator in the photoinitiator solution could be monitored via UV-VIS spectrophotometry and controlled.

A macromer solution was prepared by adding 1500 µl of photoinitiator solution to the PEGDA solution in the 20 ml glass scintillation vial. The macromer solution was stirred for approximately five minutes until all components had dissolved. Then 450 µl of the stock GOx was added to the macromer solution and the solution was allowed to mix at room temperature for about 10 minutes, resulting in a macromer/GOx solution. The macromer/GOx solution contained 15% w/v 3.4K PEGDA, 3% w/v glucose oxidase, 500 ppm Irgacure 2959 in 10 mM PBS at a pH of approximately 7.4 with approximately 80% w/v solids.

Photopolymerization of the macromer/GOx solution was then conducted according to the following procedure. A four inch round glass plate (#8477K29, McMaster-Carr) having a 125 µm Teflon film (#8569K61, McMaster-Carr) spacer permanently adhered with double sided 125 µm adhesive (#1522, 3M) was provided. Using a pipette, 1000 µl of the macromer/GOx solution was placed onto the glass plate. A second round glass plate, 3 inches in diameter, (#8477K88, McMaster-Carr) was placed evenly atop the spacers overlying the glass plate. An aluminum tube having a mirrored (aluminum foil) interior was placed between the glass plates containing macromer/GOx solution and a UV light source to maintain a constant distance. The macromer/GOx solution was then photopolymerized into a chemically crosslinked hydrogel by exposure to UV light at 365 nm using a 100 Watt lamp with maximum intensity at 14-16W/cm$^2$ (Green Spot Ultraviolet, American Ultraviolet Company, Santa Ana, Calif.) for 30 seconds.

The hydrogel (between the glass plates) was removed from the light and placed on the countertop where it was allowed to sit undisturbed for 30 seconds to complete dark polymerization. Then the top glass plate was removed and the hydrogel was peeled from the bottom glass plate using a razor blade.

The hydrogel was then washed in two sequential 10 ml aliquots of PBS for 15 minutes per wash to remove residual unreacted photoinitiator from the hydrogel. The PBS supernatant solution from each wash was analyzed using a UV spectrophotometer at 480 nm to ensure that photoinitiator concentration in the last wash was below the detection threshold. The final wash should have a photoinitiator concentration below 10 ppm measured using the standard curve for photoinitiator discussed above to ensure adequate removal of photoinitiator.

The hydrogel incorporating GOx has a clear and yellow appearance and can be stored in a refrigerator for approximately 1-2 weeks in a screw-capped bottle wrapped in parafilm to prevent moisture loss.

EXAMPLE 2

The GOx in the 15% PEG-diacrylate hydrogels was quantitatively determined according to the following assay procedure. This assay can be used to determine the concentrations of GOx in the hydrogel that are effective or advantageous for transdermal glucose monitoring using the hydrogel.

Figure 3B:
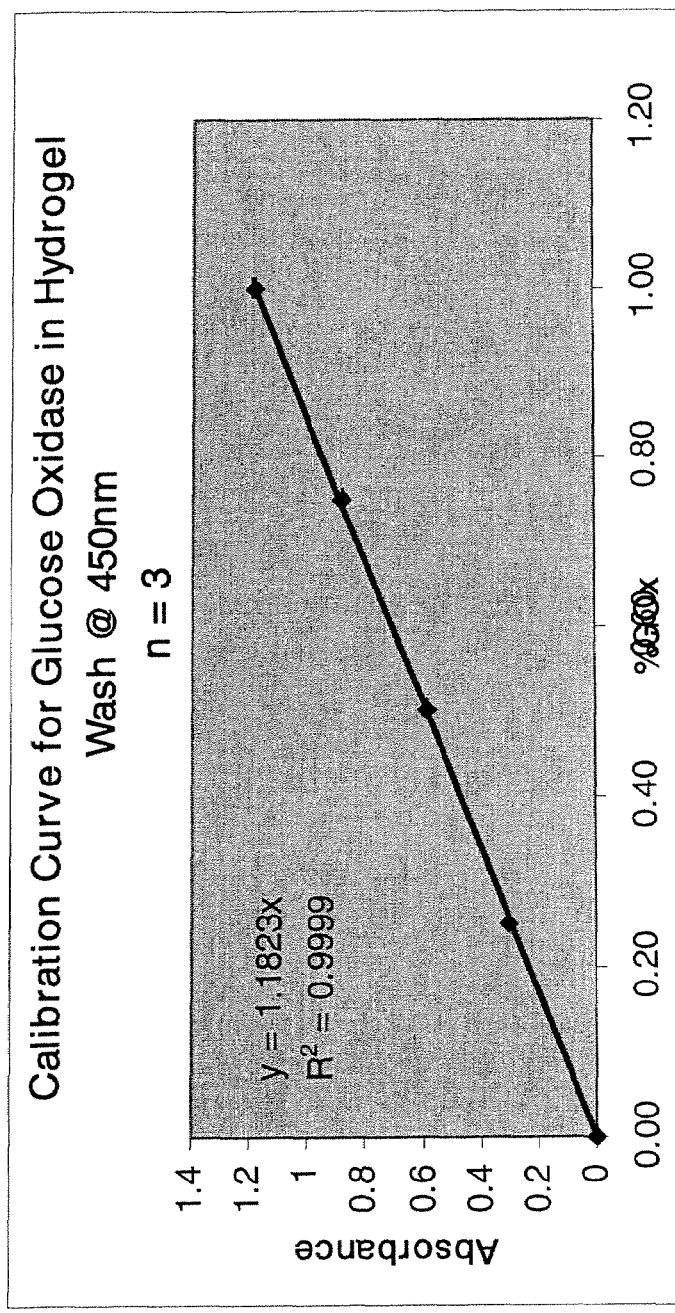
FIG. 3B is a calibration curve for measuring glucose oxidase concentration.

A calibration curve for GOx was prepared. FIG. 3A shows an ultraviolet/visible wavelength (UV-VIS, approximately 200-900 nm) absorbance spectrum for 1% glucose oxidase in a phosphate buffered saline solution using a Perkin Elmer Lambda 6 UV/VIS spectrophotometer. As can be seen from FIG. 3A, glucose oxidase has an absorbance peak at about 450 nm. The GOx concentrations used in the calibration curve, FIG. 3B, were within the range of about 0-1% w/v (mg/ml). Specifically, solutions having a GOx concentration of 0%, 0.003%, 0.006%, 0.013%, 0.025%, 0.050%, 0.125%, 0.250%, 0.375%, 0.500%, 0.750%, 1.000%) were utilized to determine the level of detection (LOD), level of quantitation (LOQ) and range of linearity for glucose oxidase. These solutions were prepared by serially diluting a stock solution of 1% GOx in wash from a "blank," i.e., a wash solution prepared by contact with a PEGDA hydrogel that did not include glucose oxidase. The blank was prepared by combining the supernatant fluid of two washes of PEGDA hydrogel obtained after the hydrogel had been washed sufficiently to remove the residual, unreacted Irgacure 2959 from the hydrogel. The stock solution was prepared by adding 50 mg of GOx to 5.0 ml of wash and stirring for about 10 minutes at room temperature until the solution appeared clear and yellow. All samples were made in triplicate (n=3) and scanned at 450 nm, which is a wavelength that is absorbed by GOx but not PEGDA or Irgacure. Using a least squares regression algorithm, the absorbance versus concentration data was fit to a linear equation. FIG. 3B shows a typical calibration curve for glucose oxidase over concentrations of 0-1% w/v. The equation, y=1.1823x, was produced using the data shown in FIG. 3B where y is the absorbance of GOx at 450 nm and x is the concentration of GOx (% w/v, expressed in mg/ml).

The Limit of Detection (LOD) was defined as the lowest concentration of GOx whereupon the spectrum is clearly visible, with its associated spectral characteristics ($\lambda_{max}$, etc.). The Limit of Quantitation (LOQ) was defined as the lowest quantifiable concentration of GOx, with a % relative standard deviation (RSD) of <10% as the criteria of acceptance. The Range of Linearity is defined as the range of concentrations at which Beer-Lambert's Law is applicable. Least-squares regression analysis on a plot of Absorbance (y-axis) versus Concentration (% w/v, mg/ml) should result in an $r^2$ value greater than 0.95.

After preparing a standard calibration curve, the following procedure was utilized to determine the concentration of GOx in the hydrogel. The instrument was zero balanced using the combined washes from a 15% w/v PEGDA hydrogel as the blank. 15% w/v hydrogels with or without GOx were prepared using identical techniques. To determine the concentration of GOx in a hydrogel, 1 ml of the 10 ml wash solution from the PEGDA(w/GOx) hydrogel was pipetted into a disposable cuvette and the absorbance of the solution at 450 nm was obtained. The concentration of GOx in the wash, was calculated using Beer Lambert's Law, A=ϵbc, where A=absorbance units, ϵ=molar absorptivity, b=pathlength of 1 cm and c=concentration (mg/ml) according to the following formula:

$$[\text{Glucose Oxidase}]_{wash}(\text{mg/ml}) = A/\epsilon b$$

The path length multiplied by the molar absorptivity is equal to the slope of the calibration curve as determined above. Thus, measurements of absorbance in the wash can be used to determine concentration of GOx in the wash using the Beer Lambert Law.

The concentration of total glucose oxidase in the hydrogel is calculated using the following equation:

[Glucose Oxidase]$_{HYDROGEL}$(mg/ml)=[Glucose Oxidase]$_{Initial}$−[Glucose Oxidase]$_{wash}$ The concentration of GOx in the hydrogel was determined. A plot of Absorbance (n=3) (y-axis) versus Concentration of GOx (mg/ml) was linear with $r^2$=0.9997. The LOD (lowest visible concentration) was 0.003% w/v GOx and the LOQ (lowest quantifiable concentration) was 0.050% approximately with a percent relative standard deviation (RSD) of 2.19. The blank (wash from hydrogel) had an open spectral window, with no interference from any ingredients (data not shown).

EXAMPLE 3

The Gel Strength of a 15% PEGDA hydrogel was determined using the following techniques. "Gel Strength," otherwise known as "Gel Modulus," is a bulk property characteristic of chemically crosslinked networks that is demonstrative of the compressive, flexural and tensile strength of the bonds that comprise the network. Increases in concentration of the pre-polymer (PEGDA) can result in a higher network density, thus enhancing the overall gel strength of the hydrogel. While gel strength is typically measured by dynamical mechanical analysis (DMA), the method described herein involves a detailed qualitative scale for gel strength, expressed through compressive, tensile and flexural handling of the hydrogel.

The aspects of gel strength are defined as follows. Cohesive Strength is a measure of intermolecular bond strength, which is a molecular property. Flexural Strength is a bulk property defined by flexural stress over flexural strain. Flexural Strength relates impact resistance and the ability of the bonds to "move" when bent. Compressive Strength is a bulk property defined by compressive stress over strain, which is related to the ability of the molecules to shift and readjust under applied pressure.

Gels were prepared as described in EXAMPLE 1 and then punched into 5/8 inch diameter disks using a die punch. The gels were washed and hydrated in 10 ml of PBS, for about 10 minutes. The gel was then placed on a glass surface, visually examined and evaluated through manipulation with a spatula to characterize strength on a scale of 1-7, as defined below.

TABLE 1

0 = "snotty", no physical integrity, gel is not one piece when lifted (no cohesive strength)
1 = loose gel with low cohesive strength; can be lifted but falls apart
2 = solid, integral gel with medium cohesive strength, i.e. breaks apart and/or tears easily, when lifted.
3 = solid, integral gel (high cohesive strength) but very brittle upon handling, no flexure strength
4 = solid, integral gel with high cohesive strength; slightly brittle, some flexure strength
5 = solid, integral gel (high cohesive strength, good flexural strength) but low compressive strength (breaks under tension and compression)
6 = solid, integral gel with high cohesive strength and high flexural strength, slight compressive strength (holds up under slight tension and pressure)
7 = solid, integral gel with high cohesive strength and high flexural strength, high compressive strength (holds up under sustained applied pressure and tension)

Figure 4:
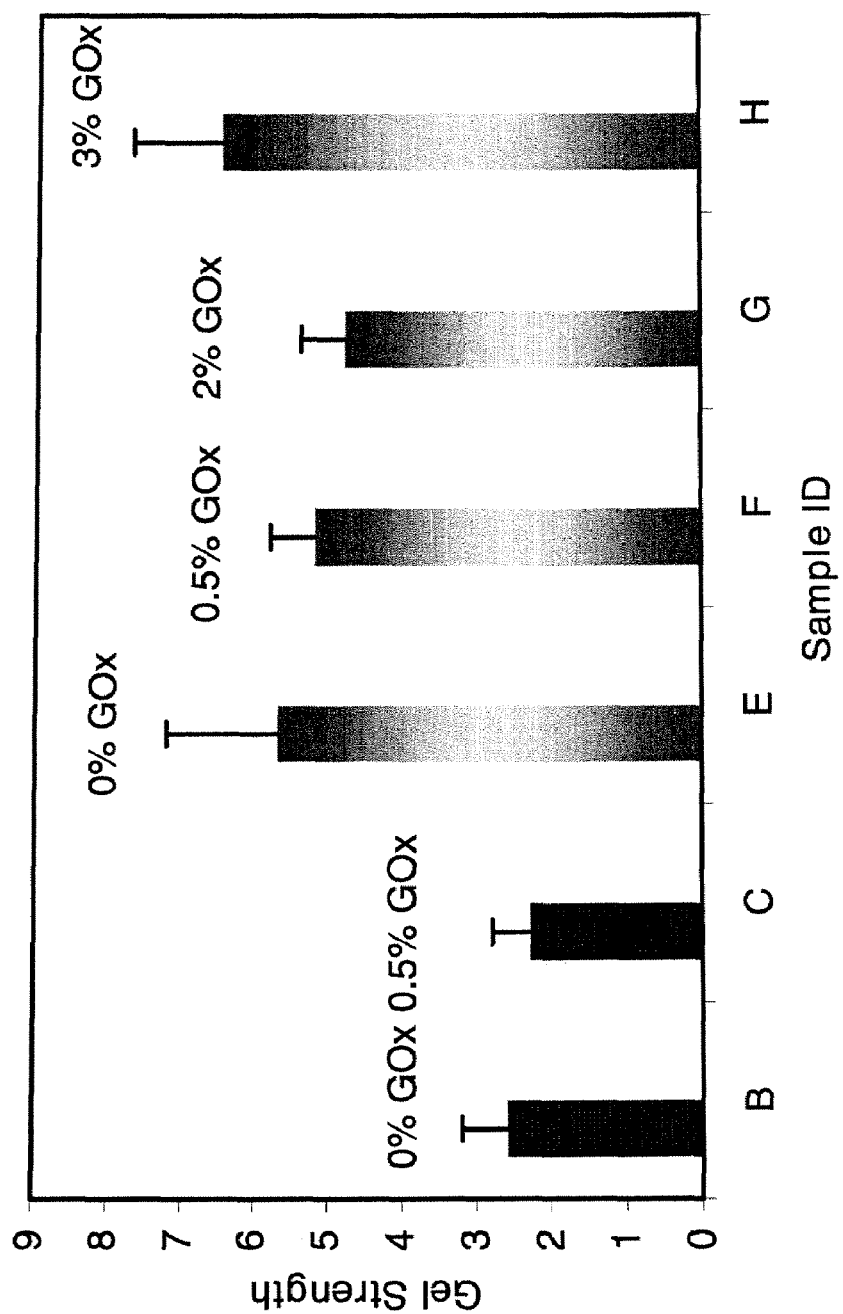
FIG. 4 is a chart showing Gel Strength of various hydrogel compositions for both 10% (crosshatch) and 15% (gray shadow) hydrogels.

Gels that were graded as "7" were characterized as solid, integral gels meeting all general criteria of cohesive, flexural and compressive strength. FIG. 4 shows the gel strength for 10% w/v PEGDA hydrogels (B, C) and 15% w/v PEGDA hydrogels (E, F, G, H). Generally, the 10% hydrogels were brittle and easy to break, relative to the 15% hydrogels. The data in FIG. 4 shows that gel strength was generally enhanced by increasing the pre-polymer concentration. Furthermore, incorporation of varying concentrations of GOx does not significantly affect the gel strength of the hydrogels.

EXAMPLE 4

The bioactivity and bioavailability of GOx in 15% PEGDA Hydrogels was determined. The following technique measures whether the GOx incorporated hydrogel mounted on the sensor has sufficient bioactivity to consume a pre-determined concentration of glucose (2.5 mg/dl). The potentiometer records the signal (mA) produced by the sensor in response to the presence of hydrogen peroxide. Hydrogen peroxide is produced by the reaction of glucose (limiting reagent) with glucose oxidase (in-excess reagent).

The following procedure was used to prepare a LPT-2 solution having a pH of about 7. A first solution was prepared by dissolving 6.12 g potassium phosphate monobasic (P 1380, Spectrum, New Brunswick, N.J.) and 7.839 g potassium phosphate dibasic (P1383, Spectrum, New Brunswick, N.J.) into 1 liter of deionized water. The first solution is 0.045 M $KH_2PO_4$ and 0.045 M $K_2HPO_4$ in deionized water. A second solution was prepared by dissolving 2 PBS tablets (P3030, Spectrum, New Brunswick, N.J.) and 4.504 g of lactic acid (L-6661, Sigma, St. Louis, Mo.) into about 190 ml of the first solution and allowing the solution to mix on a stir plate at room temperature. The pH of the second was adjusted to about 7.0, with 50% w/v sodium hydroxide (Mallinckrodt AR, cat #7705). The LPT-2 solution was made by first adding 0.4 ml of Triton-x-100 (x-100-pc, Sigma, St. Louis, Mo.) to the second solution and then adding enough of the first solution to bring the final volume to 200 ml.

GOx stock solutions were prepared in concentrations of 3% w/v, 5% w/v, and 20% w/v GOx. The 20% w/v GOx solution was prepared by adding 1 ml of PBS (pH of about 7) to 0.25 g of GOx (GO3AC, Biozyme Laboratories, San Diego, Calif.) in a 20 ml glass scintillation vial. This was allowed to stir at room temperature until clear yellow. The 3% w/v solution of GOx was prepared for potentiostat testing by diluting 0.150 ml of the 20% w/v GOx stock solution to a total volume of 1 ml with the addition of 0.850 ml of LPT-2 in a 2 ml centrifuge vial followed by vortexing. The 5% w/v solution of GOx was prepared for soaking 10% PEGDA hydrogels by adding 5 ml LPT-2 solution to 0.25 g of GOx in a 20 ml glass scintillation vial. The solution was allowed to stir at room temperature until clear yellow.

A calibration curve for glucose measurement using a free GOx sensor was prepared using the following procedures. A 5 mg/dl solution of glucose in PBS solution was prepared by adding 500 μl of 1 mg/ml stock glucose (G6918, Sigma, St. Louis, Mo.) to 5 ml of PBS (pH of about 7) in a disposable glass test tube and vortexed. Various concentrations of glucose in PBS were prepared using serial dilution of the 5 mg/dl solution of glucose in PBS. Five 2.5 ml labeled centrifuge vials containing samples in concentrations of 2.5 mg/dl, 1.25 mg/dl, 0.625 mg/dl, and 5 mg/dl glucose in PBS were prepared to make the calibration curve. A multichannel potentiostat (model VMP2, Ametek Princeton Applied Research, Oak Ridge, Tenn.) with carbon electrodes (Lot C, CTI, York, PN) on all 4 channels was used for all measurements.

The free GOx sensor was prepared using the following procedure. A 50 µl drop of GOx was added to the center of each sensor electrode via pipette and then gently covered with a ⅝" in diameter round nylon scrim. The sensor electrodes were covered with a plastic cap from a 20 ml scintillation vial containing a small piece of slightly moist cotton gauze to prevent evaporation. The potentiostat was set to burn for 5 minutes at 0.8V and then run at 0.5V. After baseline stabilization was achieved (about 10-15 minutes at 0.5V), 2 µl of 0.625 mg/dl glucose was added via a micropipette to each sensor. Subsequent additions of glucose were added after restabilization of the baseline. A plot of current (mA) versus glucose concentration (mg/dl) for a Free GOx sensor is shown as diamond shaped data points in FIG. 5C. In general, the plot of current versus glucose concentration should yield a linear curve with $r^2>0.95$. As shown in FIG. 5C, a typical calibration curve was described by the equation $y=7e-05*x+1e-05$, with a $R^2$ of 0.9962.

The GOx incorporated hydrogel sensors were prepared using the following procedures. The hydrogels were prepared as previously described in Example 1. Discs measuring ⅝" in diameter were punched out of hydrogel sheets. Hydrogels prepared from 15% w/v PEGDA and containing 3% w/v GOx were soaked in 5 ml of LPT-2 solution for 15-20 minutes. The hydrogel discs were then placed on the sensors allocated for the study. The type of sensor (carbon, platinum, etc.) needs be consistent throughout the implementation of the method. To determine variability, four hydrogel discs were placed on four sensors (n=4). Glucose at varying concentrations (mg/dl) was then added to the hydrogel disc/ sensor assembly and the signal was recorded on the potentiometer.

Figure 5A:
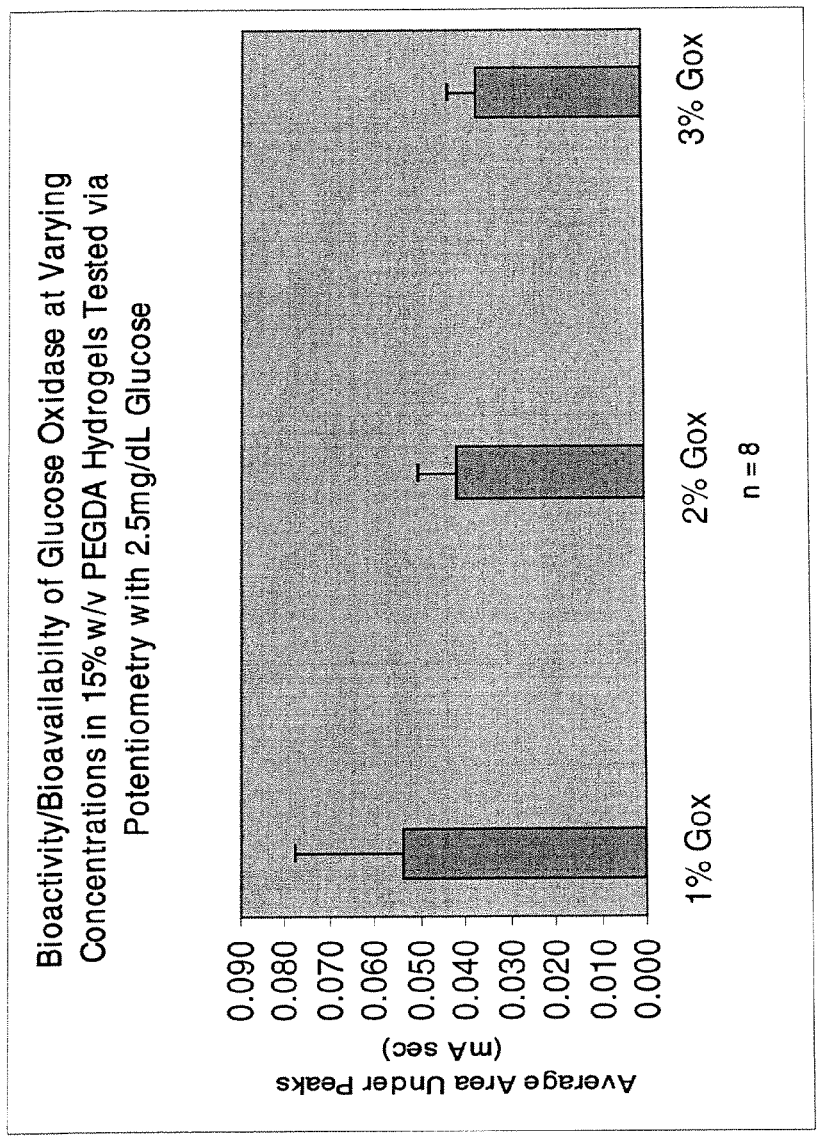
FIG. 5A is a chart showing average area under potentiometric peaks (bioactivity/bioavailability) of glucose oxidase at varying concentrations in a hydrogel.
Figure 5B:
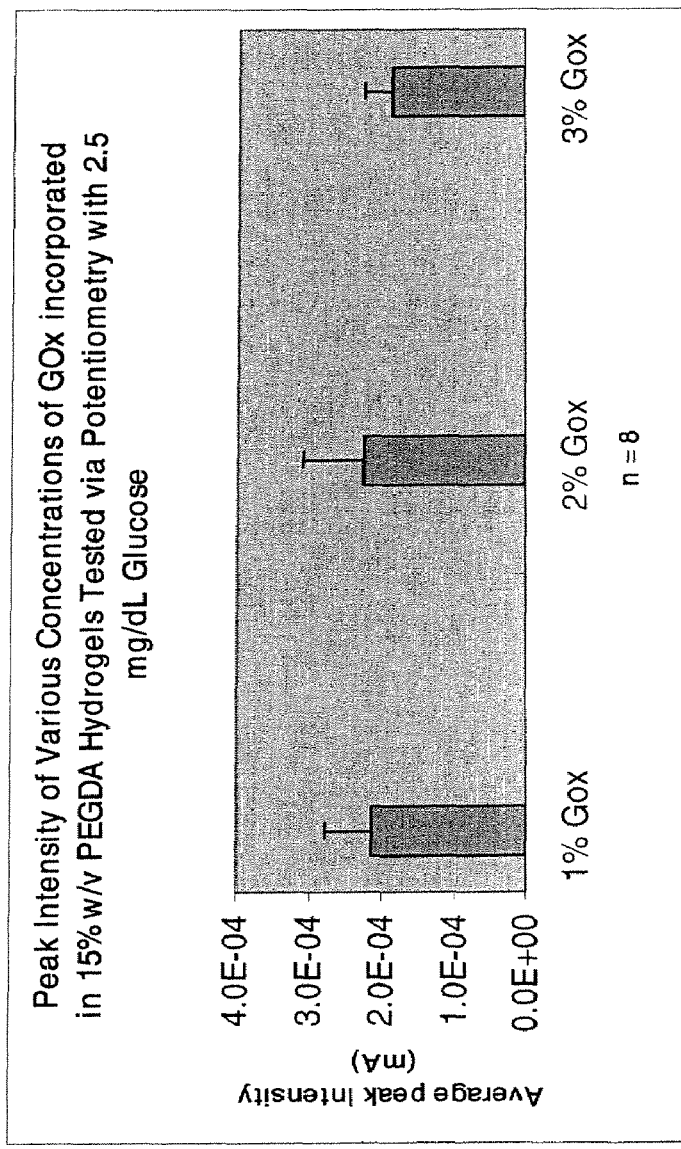
FIG. 5B is a chart showing the average potentiometric peak intensity (bioactivity) for varying concentrations of glucose oxidase in a hydrogel.
Figure 5C:
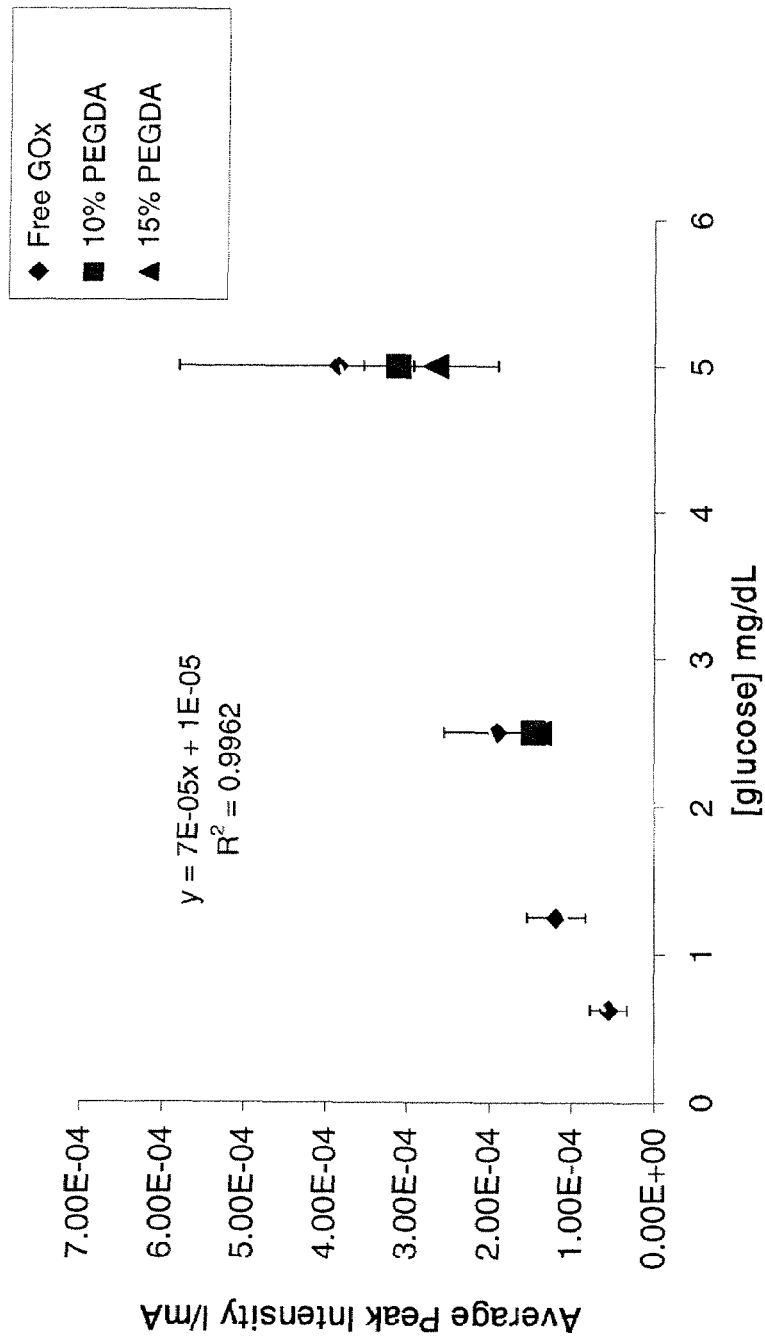
FIG. 5C is a plot showing the average potentiometric peak intensity (bioactivity) for glucose oxidase containing hydrogels (10%—square shapes, 15%—triangle shapes) and free glucose oxidase (diamond shapes).
Figure 6:
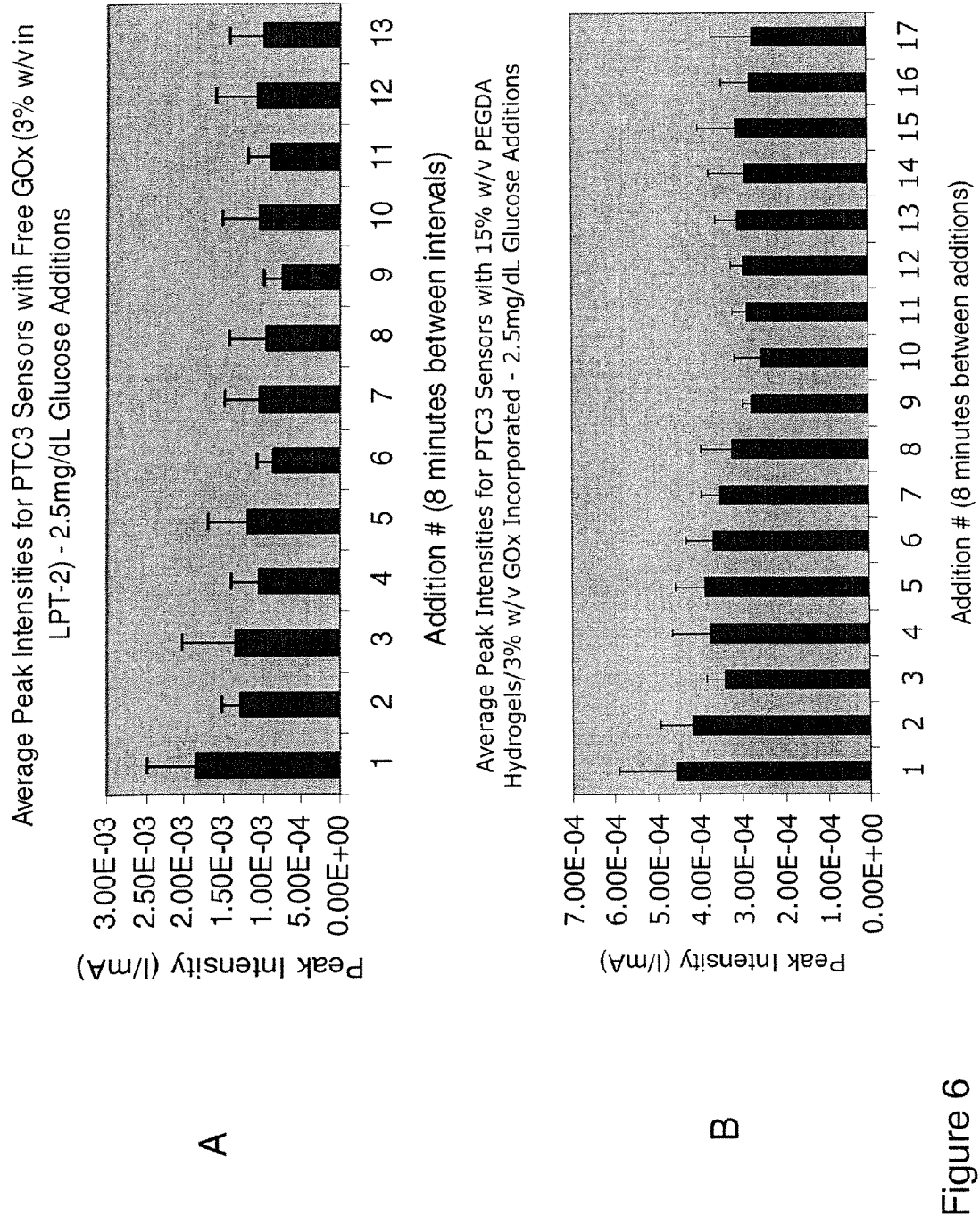
FIG. 6A is a chart showing the average potentiometric peak intensity (bioactivity) of a free glucose oxidase sensor over time in response to repeated additions of glucose.
FIG. 6B is a chart showing the average potentiometric peak intensity (bioactivity) of a glucose oxidase incorporated hydrogel sensor over time in response to repeated additions of glucose.

FIG. 5A shows the average signal areas (mA*sec) under the potentiometric peaks obtained for 1%, 2% and 3% glucose oxidase-containing 15% PEGDA hydrogels. The signal areas for all three hydrogel compositions were equivalent as measured by peak areas, demonstrating equivalent protein bioactivity and bioavailability. FIG. 5B shows the average peak intensity obtained, which is indicative of the instantly available protein to the glucose challenge (2.5 mg/dl).

FIG. 5C shows the results of potentiometry tests showing the activity and bioavailability of 10% (w/0.5% GOx) and 15% hydrogels (w/3% GOx) hydrogels. FIG. 5C includes plots of current (mA) versus glucose concentration (mg/dl) shown as a square shaped data points for 10% PEGDA hydrogel and as triangle shaped data points for 15% PEGDA hydrogel. The overlay of 10% PEGDA and 15% PEGDA data relative to the free glucose oxidase sensor data provides a high degree of confidence that the GOx incorporated in each of the hydrogels is bioactive and accessible to the glucose being monitored with the sensors. The potentiometry tests determined whether the GOx incorporated hydrogel mounted on the sensor, had sufficient bioactivity to consume a pre-determined concentration of glucose (2.5 and 5 mg/dl, respectively). The potentiometer recorded the signal (mA) produced by the sensor in response to the presence of hydrogen peroxide. Hydrogen peroxide was produced by the reaction of glucose (limiting reagent) with glucose oxidase (which is provided in-excess). FIG. 5C shows that signal produced by both 10, 15% hydrogels with 2.5 mg/dl and 5 mg/dl glucose challenges were similar to the intensity of the signals for free GOx. This indicates that GOx incorporated in both 10%, 15% w/v hydrogels is bioactive and freely accessible to glucose molecules. Furthermore, signals obtained by both types of hydrogels were equivalent. Since the 10% hydrogel contained 0.5% w/v GOx and the 15% hydrogel contained 3% w/v GOx, it indicates that the amount of enzyme incorporated into each of the hydrogels is sufficiently large compared to the amount and concentration of glucose to be detected.

EXAMPLE 5

The bioactivity of GOx incorporated Hydrogels to repeated in-vitro glucose challenges (18 glucose additions) was tested in this example, the results of which are shown in FIGS. 6A and 6B. The potentiometric signal intensities of free GOx and hydrogel-entrapped GOx were compared over successive glucose additions to determine whether the hydrogel-entrapped GOx is capable of remaining bioactive over time as glucose is monitored. This experiment demonstrates that robust potentiometric signals are obtained by repeated additions of glucose to the GOx-containing hydrogel/sensor assembly. This robust quality of GOx-containing hydrogels are desirable for glucose monitoring applications, such as continuous transdermal glucose monitoring.

The following procedures were used to test the bioactivity of GOx-Containing Hydrogels to repeated in-vitro glucose challenges. Samples of 15% PEGDA hydrogel containing 3% GOx were prepared as previously described in Example 1. The potentiometer settings were as stated in Example 4. The method for testing both free GOx and hydrogel-incorporated GOx was as written in Example 4, except that glucose charges were applied repetitiously.

A comparison of FIGS. 6A and 6B demonstrates that peak intensities obtained due to repeated glucose challenges to the GOx-incorporated hydrogel are relatively equivalent to those of free GOx, which indicates that the GOx incorporated in the hydrogel maintains adequate bioactivity and bioavailability to elicit robust signals in response to repeated glucose challenges.

EXAMPLE 6

Figure 7:
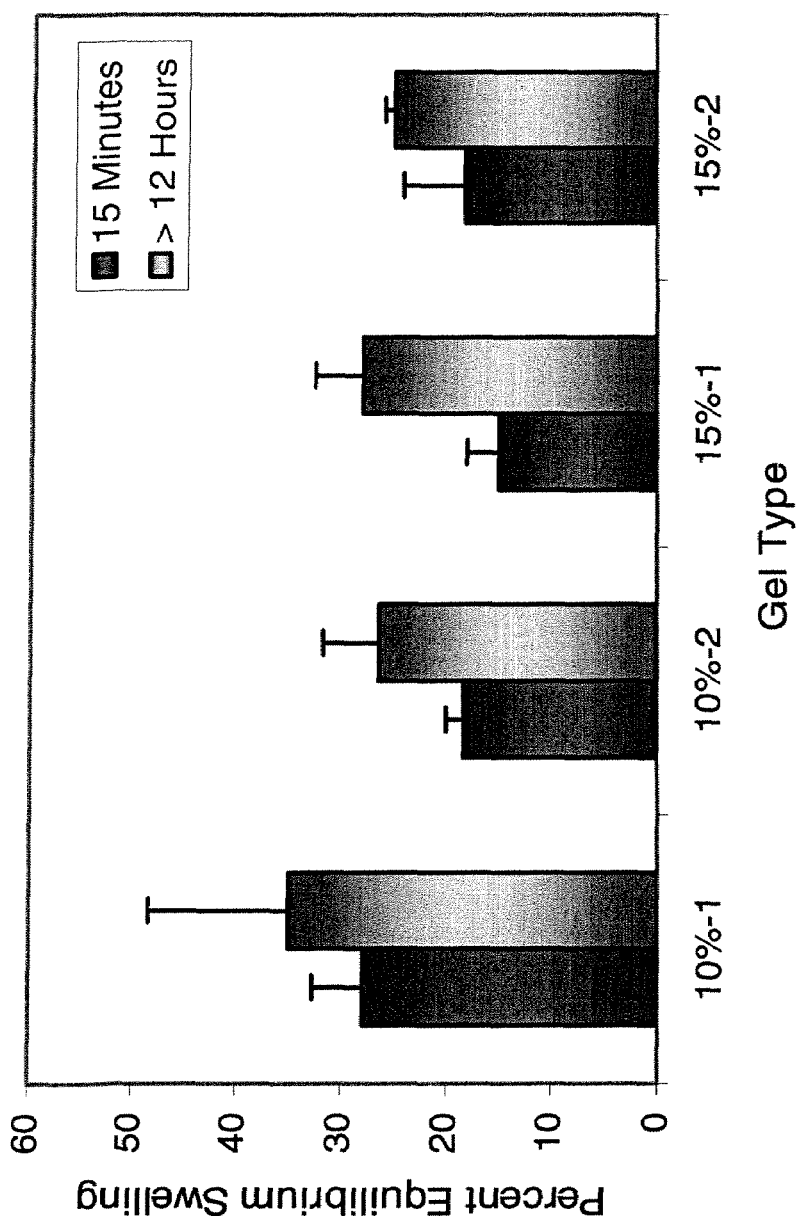
FIG. 7 is a chart showing percent equilibrium swelling for experiments conducted on 10% and 15% hydrogels.

The extent of equilibrium swelling of hydrogel network is indicative of the network density and propensity of the crosslinked polymer to absorb water. The percent equilibrium swelling of 15% PEGDA was measured according to the following procedure, the results of which are shown in FIG. 7.

Two hydrogel sheets containing 3% w/v GOx and two hydrogel sheets without GOx were synthesized and allocated as Group G and P. To prevent hydration, the hydrogels were not washed after synthesis. All other steps for preparing the hydrogels were as described in Example 1. Three hydrogel discs of ⅝" in diameter were cut from each hydrogel sheet, weighed (mass at $t_0$), and placed into individual 3.5 cm PS petri dishes. The hydrogels were then covered with PBS. The petri dishes were covered and allowed to sit at room temperature on an orbital shaker set at low/medium speed. The hydrogel discs were weighed at 15 minutes and 12 hours. In order to obtain accurate measurement of weight, the hydrogels were removed from the dishes using metal tweezers, patted gently on either side with cotton gauze to remove excess surface moisture, and then immediately weighed and returned to the PBS-filled petri dishes.

The hydrogel discs were weighed to 12 hours (mass at $t_f$) to determine total equilibrium swelling. Equilibrium swelling was calculated by: % swelling=(mass at $t_f$–mass at $t_0$)/mass at $t_0 \times 100$%. As shown in FIG. 7, percent equilibrium swelling of 10% and 15% (w/v) hydrogels were between 25-35%, after overnight hydration in phosphate buffered saline at room temperature. After overnight hydration in buffer, the loss of glucose oxidase from the 15% hydrogel (w/3% GOx) was minimal (about 0.1-0.2%) (data not shown).

EXAMPLE 7

Figure 8:
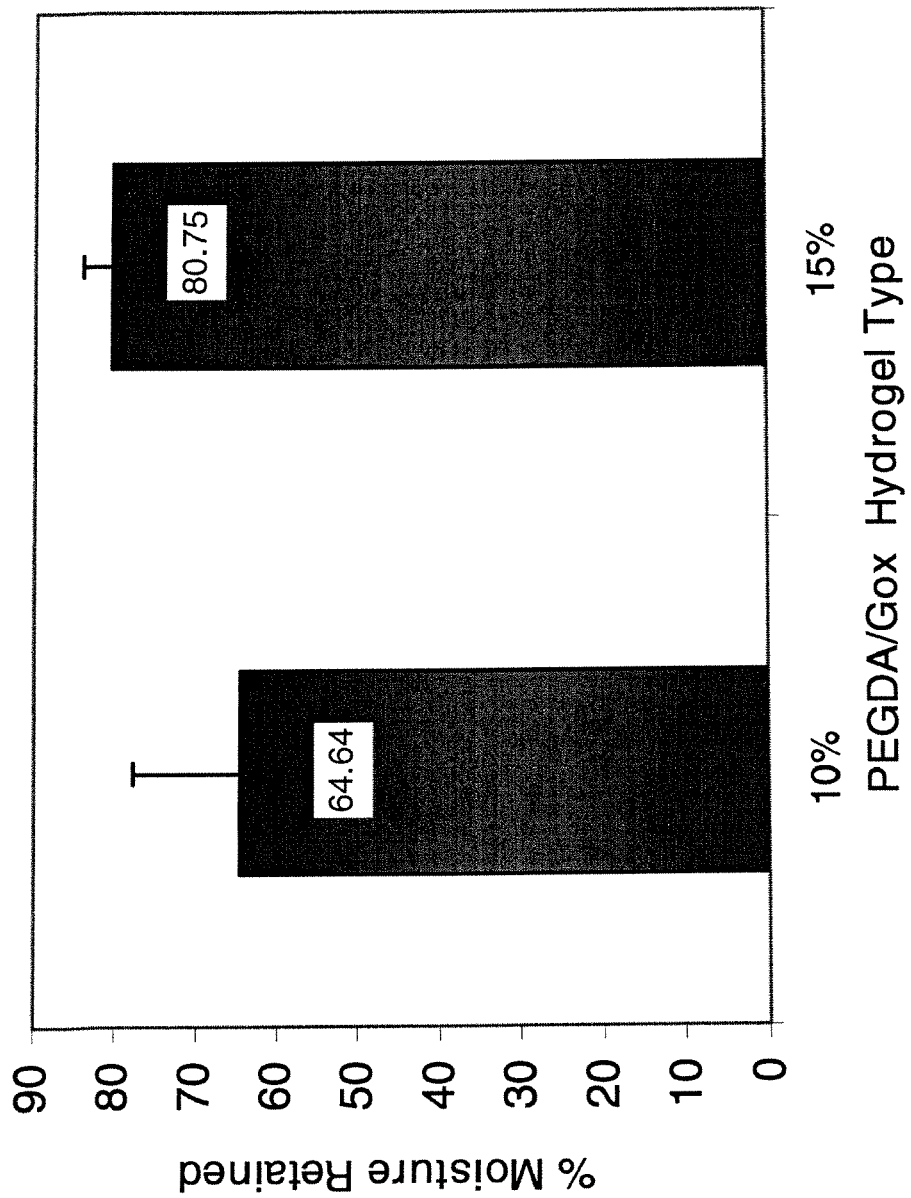
FIG. 8 is a chart showing percent moisture retention ex-vivo on SonoPrep-permeated human skin for 10% and 15% hydrogels.

To examine moisture loss of fully hydrated PEGDA hydrogels, the percent moisture retention of PEGDA Hydrogels was measured, the results of which are shown in FIG. 8. In this example, moisture loss of both 10% w/v (soaked in 5% w/v GOx) and 15% w/v (with 3% w/v incorporated GOx) hydrogels was measured. The measurement was conducted on hydrogels that were mounted on carbon sensors that were placed in direct contact with sonicated human skin over a period of 24 hours. Skin irritation and redness was also assessed over this period.

The hydrogel discs used in this example were prepared according to the following procedure. Hydrogel discs having a diameter of ⅝ inches were prepared using 10% and 15% w/v PEGDA hydrogels as previously described. The discs were soaked in 5 ml 5% GOx in LPT-2 solution overnight at 4° C. Prior to use, they were placed in a shallow weigh boat containing LPT-2 solution for 10 minutes, the solution was then drained and the weigh boat refilled with LPT-2 solution for a final rinse. The 15% w/v PEGDA/3% w/v GOx hydrogel discs were stored in PBS at 4° C. At least 20 minutes prior to use, they were placed into a shallow weigh boat filled with LPT-2 solution.

Seven human subjects were enrolled in this study and required to sign consent forms for 24 hour studies. Subjects were asked to wipe both their hand and forearm with a Sontra Skin Prep Pad. They then sonicated two sites on the cleansed forearm and wiped the area dry with cotton gauze. The sensor and hydrogel assembly used in this experiment were as follows. The sensors were B series carbon sensors (CTI, York, PN). A 2-ply double sided adhesive ring (#3044, Avery Denison, Pasadena, Calif.) was placed on the sensor, acting as a 6 mil spacer. 10 µl of gel activating solution (GAS) was dropped onto the center of the sensor. The gel activating solution had a composition of 0.16 M Phosphate, 0.0027 M KCl (potassium chloride), 0.137 M NaCl (sodium chloride), and 0.1% Triton-X-100 (Sigma Chemical #X-100-PC), with a final salt concentration of 0.3 M in deionized water. A 10% w/v PEGDA hydrogel disc was weighed and then placed on top of the hydrating GAS solution. The backing was removed from the adhesive ring and the sensor placed onto one of the sonicated sites on the subject's forearm and further secured with a Velcro strap. The sensor number was recorded along with the gel type. This was repeated for the 15% w/v PEGDA hydrogel disc.

All subjects were instructed not to bath and to avoid getting the test sites wet for the duration of the study. After about 24 hours, the sensor set-ups were removed, the hydrogels were weighed, and the skin underneath the sensors was assessed for irritation and/or redness. Percent moisture loss from the hydrogels was assessed by comparison of the weight of the hydrogel prior to and after the study. Sites where the glucose oxidase-loaded hydrogels contacted the skin for 24 hours were also assessed for redness/irritation and photographed.

Fully hydrated 10% hydrogels (0.5% GOx) and 15% hydrogels (3% GOx) were mounted on carbon sensors and placed on SonoPrep pre-treated target sites to investigate if the gels retained moisture for 24 hours. FIG. 8 shows a comparison of moisture retention for the hydrogels used in the study. The 15% hydrogels retained about 80% of their incorporated water after 24 hours on human skin, plausibly due to higher concentration of the highly hydrophilic PEG. The 10% hydrogels retained about 64% of their incorporated water after 24 hours. The area of skin that contacted the enzyme-loaded gel (10%, 15%) was assessed for skin irritation, measured redness or swelling after 24 hours. Both the 10% and the 15% w/v hydrogels showed no redness at the site of application, due to the non-allergenic nature of PEG hydrogels documented in literature.

Fully hydrated 10% hydrogels (0.5% GOx) and 15% hydrogels (3% GOx) were mounted on carbon sensors and placed on SonoPrep pre-treated target sites to investigate if the gels retained moisture for 24 hours. FIG. 8 shows the following moisture retention results. The 15% hydrogels retained about 80% of their incorporated water after 24 hours on human skin, plausibly due to higher concentration of the highly hydrophilic PEG. The 10% hydrogels retained about 64% of their incorporated water after 24 hours. The area of skin that contacted the enzyme-loaded gel (10%, 15%) was assessed for skin irritation, measured redness or swelling after 24 hours. Both the 10% and the 15% w/v hydrogels showed no redness at the site of application, due to the non-allergenic nature of PEG hydrogels documented in literature.

EXAMPLE 8

This example describes a mounting technique for mounting a GOx-incorporated hydrogel on a mesh ("scrim") using an exemplary 15% PEGDA (w/3% GOx) hydrogel.

In accordance with this example, an approximately 4"×4" square piece of 50 micron scrim was cut and placed onto a 4" diameter round glass plate. The edges were tucked under to maintain tautness. Double-sided adhesive spacers with a thickness=250 microns and with an interior diameter of 3" and an exterior diameter of 3.25" were punched out. The adhesive backing was removed from one side of the spacer and the spacer was then adhered tightly to the scrim. Excess scrim material was trimmed from around the spacer circumference. The "scrim assembly" was then placed on top of a 3.5" diameter round glass plate and covered by a second 3.5" round glass plate, which was allowed to cover approximately half of the scrim assembly. Using a 1 ml pipette, gel solution was slowly added to the scrim assembly while pressing firmly on the top glass plate. When the solution had filled the scrim material covered by the glass plate, the plate was slowly slid across the scrim to evenly spread the solution. Once the solution would no longer spread, more solution was added and the procedure repeated until the entire scrim was filled with solution and the top glass plate was aligned with the bottom. Pressure was maintained and a plastic mask with 4 holes punched in it was placed on top of the top glass plate. The entire assembly was carefully moved onto a stand beneath the UV source and photoexposed at a max intensity of 13 W/cm$^2$ for 30 seconds. After washing away the uncured macromer solution, the result was a sheet of scrim with 4 circles of desired composition (15% w/v PEGDA, MW 3.4K). This procedure was repeated using solution containing 3% w/v glucose oxidase. Both studies resulted in strong gels bound to scrim material. Furthermore, electrochemical testing using potentiometry showed that the hydrogel on scrim contained glucose oxidase which was bioavailable and bioactive. This foregoing process is capable of use with any hydrogel formulations containing any desired additive(s).

EXAMPLE 9

This example describes a gel mounted on scrim in a release liner booklet. As both a packaging design and a formulation method, a 5-layer 4" square booklet was prepared as follows (from the bottom layer up): (1) Polyester Release Liner (solid square); (2) Double-sided adhesive (four %₁₆"d circles punched out); (3) Scrim Material (solid square); (4) Double-sided adhesive (four %₁₆"d circles punched out); and (5) Polyester Release Liner (four 9/16" diameter circles punched out). Each 9/16" "reservoir" was filled with 48 microliters of 15% w/v PEGDA with 3% w/v incorporated glucose oxidase solution. The entire assembly was photopolymerized for 30 seconds. The resulting hydrogel circles stuck to the release liners, due to fluoro groups on the polyester. Although polyester can be used as the release liner material, other materials such as, for example, PTFE/Teflon, may be used to obtain similar results.

EXAMPLE 10

In this example, photopolymerization of hydrogels through a Teflon sheet was investigated to determine whether hydrogels could be photopolymerized through a typical release liner material.

A 75 micron Teflon sheet was placed on a platform beneath the Green Spot UV Light. Approximately 250 microliters of PEGDA/GOx solution was deposited via pipette on top of Teflon sheet. A second 75 micron Teflon sheet was placed atop the first, sandwiching the macromer solution between the two. The UV light source was set for 30 seconds of photoexposure time. The solution appeared to crosslink to completion (producing a strong, integral gel) and did not stick to the Teflon material. These results showed that crosslinking through release liners is a feasible option and that using material that is not fluorinated will reduce probability of sticking. Thus hydrogels with and without scrim may crosslinked using photocrosslinking through one or more release liners.

EXAMPLE 11

In this example, a gel/scrim assembly was constructed such that there was equal gel thickness on both the top and bottom of the scrim. The gel thickness in this assembly may be modulated by varying the thickness of the ring spacers used. According to this example, a prototype hydrogel and sensor may be placed into the package assembly where the gel can maintain its moisture while the sensor remains free from direct contact with moisture.

Adhesive rings were die cut with a 3/4 inch outer diameter and a 7/16 inch inner diameter. The backing was removed from one ring and it was adhered to a Teflon block (a glass plate may be used but is difficult to remove adhesive from it afterward). The ring was then filled until level with macromer solution. The top adhesive backing was removed and a 50 micron scrim was placed securely on top. The scrim was cut to allow for several inches of excess "tail" for packaging purposes. The backing was removed from one side of the second adhesive ring and the ring adhered atop the scrim was aligned with the first ring. The ring/scrim assembly was then filled to the top with the macromer solution, adding enough for the solution to be flush with the top rim. The gel/scrim assembly was photopolymerized under UV light for 30 seconds and then washed with PBS. This was done both with and without a Teflon release liner covering the top. The release liner is unnecessary for general research purposes but is provides certain advantages relating to ease of use in an application such as transdermal glucose monitoring. The gels were evenly distributed throughout the desired area of the scrim.

EXAMPLE 12

This example involves cationic hydrogels, such as PEG-diacrylate / Polyethyleneimine (PEGDA-PEI) based hydrogels, which have desirable properties for certain hydrogel applications. Polyethyleneimine (branched, or dendrimer, Sigma Chemicals) can be incorporated within PEG diacrylate hydrogels to impart cationic character. Cationic hydrogels are capable of ionically interacting with slightly anionic glucose oxidase to provide a controlled release reservoir for the enzyme.

A solution comprising 0.3-0.5% PEI, 10% PEGDA, 500 ppm Irgacure 2959 and 5% glucose oxidase can be photo-crosslinked with a BlakRay UV light, as described above. Incorporation of the highly cationic PEI provides a high-binding substrate for GOx resulting in slow release of the enzyme from the matrix. Furthermore, the highly cationic character of the hydrogels provides the added functionality of bioadhesivity to the skin. Other cationic, bioadhesive macromolecules that can be incorporated into PEGDA hydrogels are chitosan, polyamidoamine, poly(n-vinyl pyrrolidone), etc.

EXAMPLE 13

Figure 9:
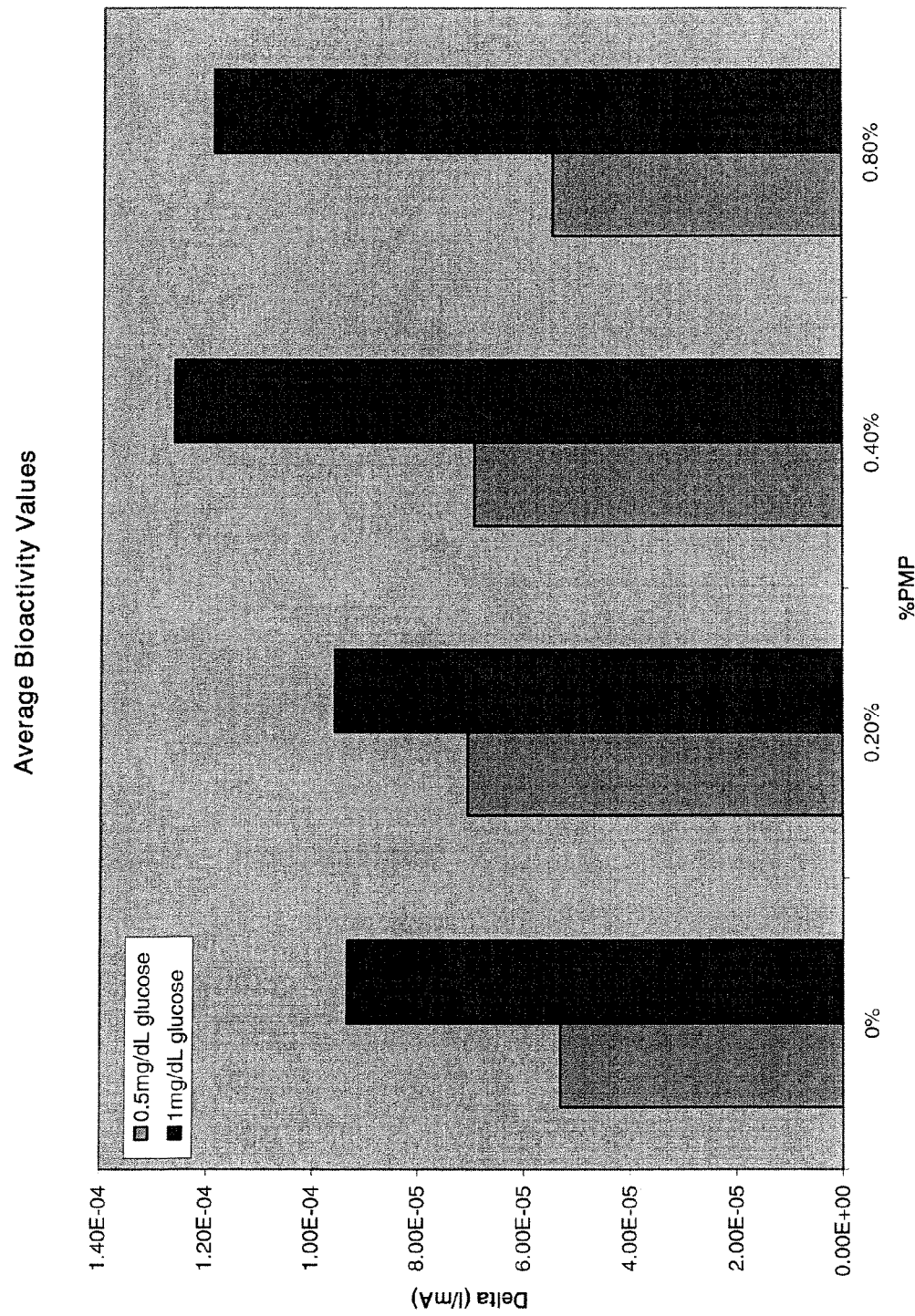
FIG. 9 is a plot of average potentiometric peak intensity (bioactivity) versus percentage of PMP incorporated in hydrogels.

This example involves anionic hydrogels, such as PEG-diacrylate/ Poly(2-acrylamide-2-methyl-1-propane sulfonic acid) (PMP) based hydrogels, which have desirable properties for certain hydrogel applications. FIG. 9 shows signal intensity measured against % w/v PMP. Initially, studies involving PMP showed that there existed a possibility that incorporation of PMP may increase signal intensity. These studies, however, were not conclusive due to the fact that there were other variables involved, such as varying MW, wt % PEGDA, incorporation of NVP in some samples, etc. FIG. 9 depicts the results of a study involving 15% w/v 3.4K PEGDA which shows an increase in peak signal intensity with increasing PMP (%w/v). As shown in FIG. 9, concentrations of PMP up to 0.6% w/v show an initial increase in signal intensity of the hydrogel followed by a decrease in gel signal intensity as the PMP concentration is increased above 0.6% w/v.

EXAMPLE 14

This example involves, "Tight Mesh" Hydrogels, such as PEG-diacrylate/Dendrimer PEG-acrylate based hydrogels. To slow down release of the incorporated glucose oxidase if necessary, blend formulations of PEG-diacrylate and Dendrimer PEG-acrylate can be used generate crosslinked networks of varied mesh size. Dendrimer PEG-acrylate can be used as the macromer molecule alone to fabricate slow protein releasing hydrogels. Hydrogels such as these may be applied advantageously to applications such as extended duration glucose monitoring.

Other embodiments and uses of the invention will be apparent to those skilled in the art from consideration of the specification and practice of the invention disclosed herein. The techniques for enhancing transdermal transport described herein may be applied to any procedure that utilizes permeation of a biological membrane (e.g., skin). For instance, the delipidation and/or hydration products and techniques described herein may be applied to continuous transdermal blood glucose monitoring, transdermal drug delivery, electrophysiology, or any technology that entails increasing the porosity of a biological membrane. All references cited herein, including all U.S. and foreign patents and patent applications, are specifically and entirely hereby incorporated herein by reference. It is intended that the specification and examples be considered exemplary only, with the true scope and spirit of the invention indicated by the following claims.

What is claimed is:

1. A transdermal biosensor including a skin-contacting hydrogel comprising an electrode, a crosslinked gel structure, and a biologically active enzyme incorporated into the crosslinked gel structure, the biologically active enzyme which converts glucose into a compound having potentiometric activity that is detectable when the biosensor is placed on a patient's skin, wherein the hydrogel is obtained from a solution comprising:
   a macromer comprising at least one hydrophilic polymeric block including polyethylene glycol that is end-terminated with at least one cross-linkable group;
   an initiator; and
   the biologically active enzyme, wherein the macromer solution comprises greater than 10% macromer (w/v) and the macromer is of sufficient molecular weight to form a network mesh upon crosslinking that entraps the biologically active enzyme.

2. The hydrogel biosensor according to claim 1, wherein the macromer is obtained from dry macromer having an inhibitor content within the range of about 10 to 500 ppm.

3. The hydrogel biosensor according to claim 1, wherein the macromer is a tri-, tetra-, penta-, star, dendritic or branched macromer.

4. The hydrogel biosensor according to claim 1, further comprising a second macromer having a different structure than the first macromer.

5. The hydrogel biosensor according to claim 1, wherein the macromer is a copolymer further comprising a vinyl moiety.

6. The hydrogel biosensor according to claim 1, wherein the vinyl moiety is n-vinyl acetate or n-vinyl acrylate.

7. The hydrogel biosensor according to claim 1, wherein the macromer solution further comprises a non.-crosslinkable polymer.

8. The A hydrogel biosensor according to claim 7, wherein the non-crosslinkable polymer is polyacrylic acid.

9. The A hydrogel biosensor according to claim 1, wherein the cross-linkable group is an ethylenically unsaturated group.

10. The hydrogel biosensor according to claim 9, wherein the ethylenically unsaturated group is an acrylate, a diacrylate, a methacrylate, an isocyanate, a di-isocyanate, an epoxide, an isothiocyanate, an aldehyde, an amine, a sulfonic acid or a carboxylic acid.

11. The hydrogel biosensor according to claim 1, wherein the macromer solution further comprises an excipient that is different than the macromer.

12. The hydrogel biosensor according to claim 11, wherein the excipient is sodium lauryl sulfate, n-vinyl acetate, acetic acid, sodium chloride, phosphates, trehalose, polyacrylic acid, chitosan, a hyaluronic acid, a PEG, a mPEG-monoacrylate, polyethyleneimine, a dendritic polyethyleneimine (PEI), a poly(amidoamine) (PAMAM), carboxymethycellulose (CMC), poly(vinyl pyrrolidone)(PVP), poly(vinyl acetate) (PVAc), poly(2-acrylamide-2-methyl-1-propanesulfonic acid) (PMP), a sorbitan, a Tween, a Span, or a derivatized PEGs.

13. The hydrogel biosensor according to claim 1, wherein a initiator concentration in the macromer solution is 2500 ppm or less.

14. The hydrogel biosensor according to claim 1, wherein degree of end-capping of the macromer exceeds about 90%

15. The A hydrogel biosensor according to claim 1, wherein the enzyme is glucose oxidase.

16. The A hydrogel biosensor according to claim 1, wherein at least 60% of the bioactivity of the incorporated biologically active molecule is maintained when measured by potentiometry over seventeen consecutive additions of glucose at a concentration of 2.5 mg/dL with eight minutes elapsing between each consecutive addition of glucose.

17. The hydrogel biosensor according to claim 1, wherein the hydrogel retains moisture such that it maintains at least 60% of its fully hydrated weight after contact with skin for a period of 24 hours.

18. The hydrogel biosensor according to claim 1, wherein the hydrogel swells at least about 15% after soaking in phosphate buffered saline for 15 minutes and swells less than about 30% after soaking in phosphate buffered saline for 12 hours.

19. The hydrogel biosensor according to claim 1, wherein the crosslinked get structure is obtained from a macromer having an average molecular weight within a range of 3 to 4 K Daltons.

20. The hydrogel biosensor according to claim 19, wherein the macromer is a polyethylene glycol multifunctional acrylate.

21. The hydrogel biosensor according to claim 1, wherein the macromer solution comprises at least 15% w/v macromer.

* * * * *